(12) United States Patent
Peters, Jr. et al.

(10) Patent No.: US 8,255,463 B2
(45) Date of Patent: *Aug. 28, 2012

(54) SYSTEM AND METHOD FOR PROVIDING MULTI-MEDIA SERVICES TO COMMUNICATION DEVICES OVER A COMMUNICATIONS NETWORK

(75) Inventors: Robert Yaeger Peters, Jr., Rumson, NJ (US); Harish Samarasinghe, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 570 days.

This patent is subject to a terminal disclaimer.

(21) Appl. No.: 11/833,648

(22) Filed: Aug. 3, 2007

(65) Prior Publication Data

US 2008/0022014 A1   Jan. 24, 2008

Related U.S. Application Data

(63) Continuation of application No. 10/236,623, filed on Sep. 6, 2002, now Pat. No. 7,254,643, which is a continuation-in-part of application No. 10/216,001, filed on Aug. 8, 2002, now abandoned.

(51) Int. Cl.
*G06F 15/16* (2006.01)
(52) U.S. Cl. ........................................ 709/205; 709/217
(58) Field of Classification Search .......... 379/111–141; 709/227–230, 204–207
See application file for complete search history.

(56) References Cited

U.S. PATENT DOCUMENTS

| | | | |
|---|---|---|---|
| 5,148,452 A | 9/1992 | Kennedy et al. | |
| 5,448,631 A | 9/1995 | Cain | |
| 5,475,740 A * | 12/1995 | Biggs et al. | 379/91.02 |
| 5,717,745 A | 2/1998 | Vijay et al. | |
| 5,790,176 A | 8/1998 | Craig | |
| 5,867,494 A | 2/1999 | Krishnaswamy et al. | |
| 5,920,283 A | 7/1999 | Shaheen et al. | |
| 5,926,649 A | 7/1999 | Ma et al. | |
| 5,936,940 A | 8/1999 | Marin et al. | |
| 6,038,230 A | 3/2000 | Ofek | |
| 6,058,438 A | 5/2000 | Diehl et al. | |
| 6,078,290 A | 6/2000 | McBurney et al. | |
| 6,141,759 A | 10/2000 | Braddy | |
| 6,161,134 A | 12/2000 | Wang et al. | |
| 6,198,930 B1 | 3/2001 | Schipper | |
| 6,229,819 B1 | 5/2001 | Darland et al. | |

(Continued)

FOREIGN PATENT DOCUMENTS

EP    1179927 A2    2/2002

(Continued)

*Primary Examiner* — Ian N Moore
*Assistant Examiner* — Afshawn Towfighi

(57) ABSTRACT

A method of processing multi-media service requests received at a multi-media services provider computer system, including a processor coupled to a media gateway controller and to a media server. The method includes receiving a message from a SIP INVITE-enabled communication device at the media gateway controller. The message is processed at the media gateway controller and at the processor for generating an instruction message with unique indicators, which is communicated to the media server in a SIP INVITE format. The media server processes the instruction message to provide media services and collect user-information from the communication device. The media server processes the user-information and generates a first message in an HTTP form POST format with unique indicators, which includes the user-information and which can be processed at the processor. In this manner, the multi-media services provider computer system is compatible with the SIP INVITE-enabled device.

15 Claims, 18 Drawing Sheets

U.S. PATENT DOCUMENTS

| | | |
|---|---|---|
| 6,240,391 B1 | 5/2001 | Ball et al. |
| 6,259,691 B1 | 7/2001 | Naudus |
| 6,272,131 B1 | 8/2001 | Ofek |
| 6,272,132 B1 | 8/2001 | Ofek et al. |
| 6,330,236 B1 | 12/2001 | Ofek et al. |
| 6,356,294 B1 | 3/2002 | Martin et al. |
| 6,377,579 B1 | 4/2002 | Ofek |
| 6,377,674 B1 | 4/2002 | Chong et al. |
| 6,404,746 B1 | 6/2002 | Cave et al. |
| 6,421,674 B1 | 7/2002 | Yoakum et al. |
| 6,434,143 B1 | 8/2002 | Donovan |
| 6,438,555 B1 | 8/2002 | Orlon |
| 6,438,594 B1 | 8/2002 | Bowman-Amuah |
| 6,445,776 B1 | 9/2002 | Shank et al. |
| 6,446,127 B1 | 9/2002 | Schuster et al. |
| 6,477,150 B1 | 11/2002 | Maggenti et al. |
| 6,480,588 B1 | 11/2002 | Donovan |
| 6,483,600 B1 | 11/2002 | Schuster et al. |
| 6,484,174 B1 | 11/2002 | Wall et al. |
| 6,487,407 B2 | 11/2002 | Goldberg et al. |
| 6,560,326 B1 | 5/2003 | Clark |
| 6,567,398 B1 | 5/2003 | Aravamudan et al. |
| 6,603,428 B2 | 8/2003 | Stilp |
| 6,615,236 B2 | 9/2003 | Donovan et al. |
| 6,622,016 B1 | 9/2003 | Sladek et al. |
| 6,646,595 B1 | 11/2003 | Heng et al. |
| 6,650,619 B1 | 11/2003 | Schuster et al. |
| 6,680,943 B1 | 1/2004 | Gibson et al. |
| 6,690,783 B2 | 2/2004 | Creamer et al. |
| 6,694,145 B2 | 2/2004 | Riikonen et al. |
| 6,732,175 B1 | 5/2004 | Abjanic |
| 6,735,621 B1 | 5/2004 | Yoakum et al. |
| 6,741,687 B1 * | 5/2004 | Coppage ................ 379/114.2 |
| 6,741,695 B1 | 5/2004 | McConnell et al. |
| 6,763,384 B1 | 7/2004 | Gupta et al. |
| 6,766,007 B1 | 7/2004 | Dermler et al. |
| 6,768,722 B1 | 7/2004 | Katseff et al. |
| 6,775,269 B1 | 8/2004 | Kaczmarczyk et al. |
| 6,813,342 B1 | 11/2004 | Chu et al. |
| 6,857,021 B1 | 2/2005 | Schuster et al. |
| 6,879,828 B2 | 4/2005 | Virtanen et al. |
| 6,882,850 B2 | 4/2005 | McConnell et al. |
| 6,888,828 B1 | 5/2005 | Partanen et al. |
| 6,888,937 B1 | 5/2005 | Kurapati |
| 6,904,140 B2 | 6/2005 | Trossen |
| 6,928,150 B2 | 8/2005 | Johnston |
| 6,934,279 B1 | 8/2005 | Sollee et al. |
| 6,947,531 B1 | 9/2005 | Lewis et al. |
| 6,947,724 B2 | 9/2005 | Chaney |
| 6,954,654 B2 | 10/2005 | Ejzak |
| 6,961,334 B1 | 11/2005 | Kaczmarczyk |
| 6,963,635 B1 | 11/2005 | Jones |
| 7,020,707 B2 | 3/2006 | Sternagle |
| 7,031,747 B2 | 4/2006 | Cyr et al. |
| 7,035,248 B2 | 4/2006 | Wengrovitz |
| 7,054,945 B2 | 5/2006 | Hurtta et al. |
| 7,058,068 B2 | 6/2006 | Gawargy et al. |
| 7,085,260 B2 | 8/2006 | Karaul et al. |
| 7,123,700 B2 | 10/2006 | Weaver et al. |
| 7,142,534 B1 | 11/2006 | Whent et al. |
| 7,167,468 B2 | 1/2007 | Donovan |
| 7,180,912 B1 | 2/2007 | Samarasinghe |
| 7,184,418 B1 | 2/2007 | Baba et al. |
| 7,184,534 B2 | 2/2007 | Birch et al. |
| 7,221,945 B2 | 5/2007 | Milford et al. |
| 7,254,643 B1 * | 8/2007 | Peters et al. ................ 709/246 |
| 7,272,133 B2 | 9/2007 | Valin et al. |
| 7,369,844 B2 | 5/2008 | Hestir |
| 7,508,923 B1 | 3/2009 | Samarasinghe |
| 7,664,102 B1 | 2/2010 | Samarasinghe |
| 8,009,666 B2 | 8/2011 | Samarasinghe |
| 2001/0017598 A1 | 8/2001 | Townsend et al. |
| 2001/0027491 A1 | 10/2001 | Terretta et al. |
| 2002/0062379 A1 | 5/2002 | Widegren et al. |
| 2002/0064164 A1 | 5/2002 | Barany et al. |
| 2002/0087693 A1 | 7/2002 | Marshall et al. |
| 2002/0106989 A1 * | 8/2002 | Aizawa et al. ............. 455/67.1 |
| 2002/0110113 A1 | 8/2002 | Wengrovitz |
| 2002/0120760 A1 | 8/2002 | Kimchi et al. |
| 2002/0123029 A1 | 9/2002 | Knowles |
| 2002/0126701 A1 | 9/2002 | Requena |
| 2002/0136206 A1 | 9/2002 | Gallant et al. |
| 2002/0136370 A1 | 9/2002 | Gallant |
| 2002/0141381 A1 | 10/2002 | Gawargy et al. |
| 2002/0141404 A1 | 10/2002 | Wengrovitz |
| 2002/0147818 A1 | 10/2002 | Wengrovitz |
| 2002/0150079 A1 | 10/2002 | Zabawskyj et al. |
| 2002/0156903 A1 | 10/2002 | Bach Corneliussen |
| 2002/0176404 A1 | 11/2002 | Girard |
| 2002/0176557 A1 | 11/2002 | Burger |
| 2002/0176559 A1 | 11/2002 | Adamek et al. |
| 2002/0196797 A1 | 12/2002 | Battin |
| 2003/0007486 A1 | 1/2003 | March et al. |
| 2003/0012150 A1 | 1/2003 | Chapuran et al. |
| 2003/0016679 A1 | 1/2003 | Adams et al. |
| 2003/0018766 A1 | 1/2003 | Duvvuru |
| 2003/0026289 A1 | 2/2003 | Mukherjee et al. |
| 2003/0028654 A1 | 2/2003 | Abjanic et al. |
| 2003/0058838 A1 | 3/2003 | Wengrovitz |
| 2003/0076815 A1 | 4/2003 | Miller et al. |
| 2003/0079020 A1 | 4/2003 | Gourraud et al. |
| 2003/0105864 A1 | 6/2003 | Mulligan et al. |
| 2003/0105962 A1 | 6/2003 | Le et al. |
| 2003/0108179 A1 | 6/2003 | Chang et al. |
| 2003/0110292 A1 | 6/2003 | Takeda et al. |
| 2003/0179762 A1 | 9/2003 | Isomaki et al. |
| 2003/0206519 A1 | 11/2003 | Sanders et al. |
| 2003/0212800 A1 | 11/2003 | Jones et al. |
| 2003/0223570 A1 | 12/2003 | Partanen et al. |
| 2003/0235184 A1 | 12/2003 | Dorenbosch et al. |
| 2004/0008837 A1 | 1/2004 | Sylvain |
| 2004/0103157 A1 | 5/2004 | Requena et al. |
| 2004/0120498 A1 | 6/2004 | Sylvain |
| 2004/0205576 A1 | 10/2004 | Chikirivao et al. |
| 2005/0021616 A1 | 1/2005 | Rajahalme et al. |
| 2008/0022014 A1 | 1/2008 | Peters, Jr. et al. |
| 2009/0168764 A1 | 7/2009 | Samarasinghe |

FOREIGN PATENT DOCUMENTS

| | | |
|---|---|---|
| EP | 1213659 A2 | 6/2002 |
| WO | WO 01/63317 A1 | 8/2001 |
| WO | WO 01/63877 A1 | 8/2001 |
| WO | WO 01/63956 A1 | 8/2001 |
| WO | WO 01/72007 A1 | 9/2001 |
| WO | WO 02/21859 A1 | 3/2002 |
| WO | WO 02/45439 A2 | 6/2002 |

* cited by examiner

FIG. 2B

```
52a-a ⌒ sip-req:  INVITE sip:7329497821@lucent.com SIP/2.0
  52a ⌒ Header:  VIA: SIP/2.0/UDP att.com:5060
  52b ⌒ Header:  From: sip:7324204699@att.com
  52c ⌒ Header:  To: <sip:7329497821@lucent.com>
  52d ⌒ Header:  Call-ID: c3943000-6978b-2995c 2e323931@att.com
  52e ⌒ Header:  CSeq: 100 INVITE
  52f ⌒ Header:  Expires: 180
  52g ⌒ Header:  User-Agent: Cisco IP Phone/Rev. 1/SIP enabled
  52h ⌒ Header:  Accept: application/sdp
  52i ⌒ Header:  Contact: sip:7324204699@att.com:5060
  52j ⌒ Header:  Content-Type: application/sdp
  52k ⌒ Header:  Content-Length: 180

-Unique-Boundary-Content-Type: application/sdp
            V = 0
            O = 7324204699 7324204699 IN 1P4 89.4.0.11
            S = SDP seminar
            C = IN IP4 89.4.0.11
            T = 7329497821 7329497821
            M = audio 5002 RTP/AVP 0 8
            A = Sendonly
            A = Ptime: 30
            A = RTPMAP: 0 pcmu/8000/8
            A = RTPMAP: 8 PCMA/8000/8

-Unique-Boundary-Content-Type: application/multimedia
            session with single INVITE 54a ⌒ Service Query Flag = Service Processing Completed or Required
  54b ⌒ Routing Number = 9082341234
  54c ⌒ Original Dialed Number = 7329497821
  54d ⌒ Billing Module -Unique-Boundary-
```

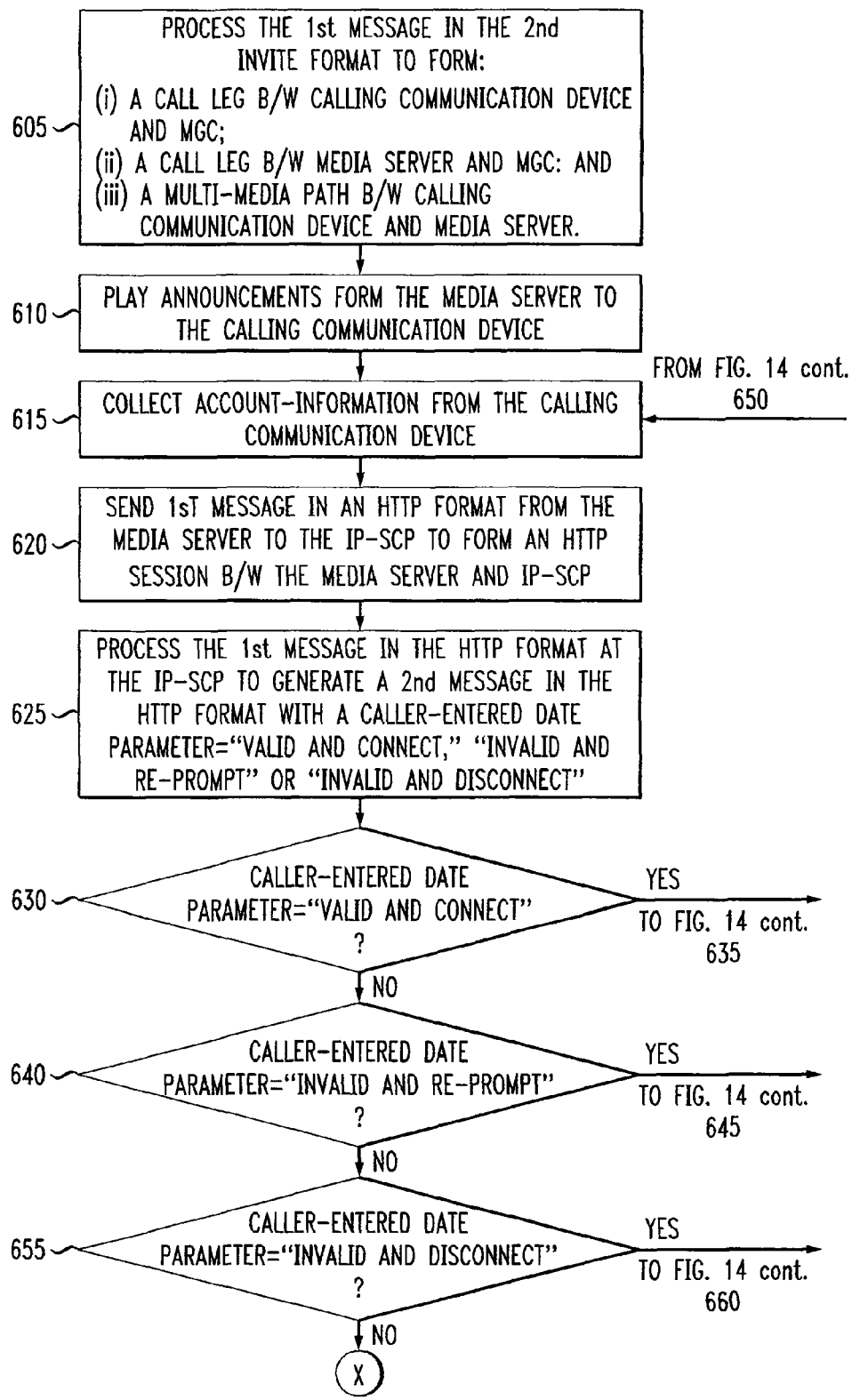

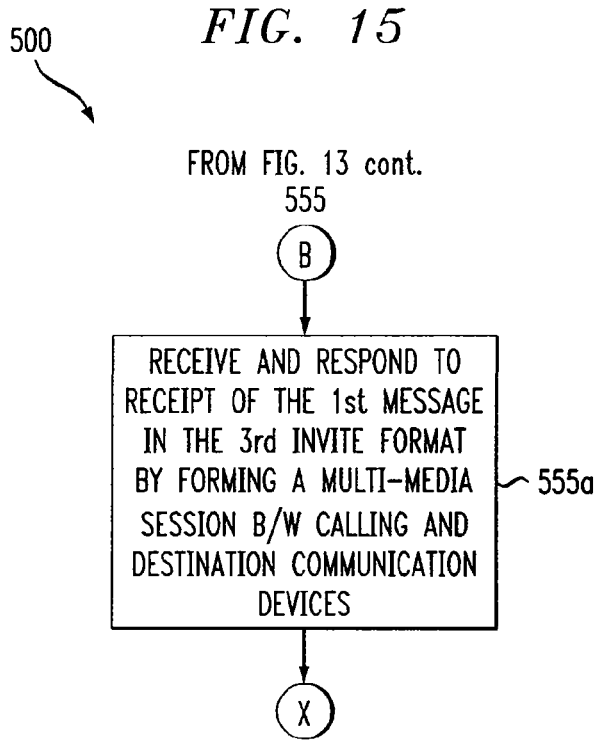
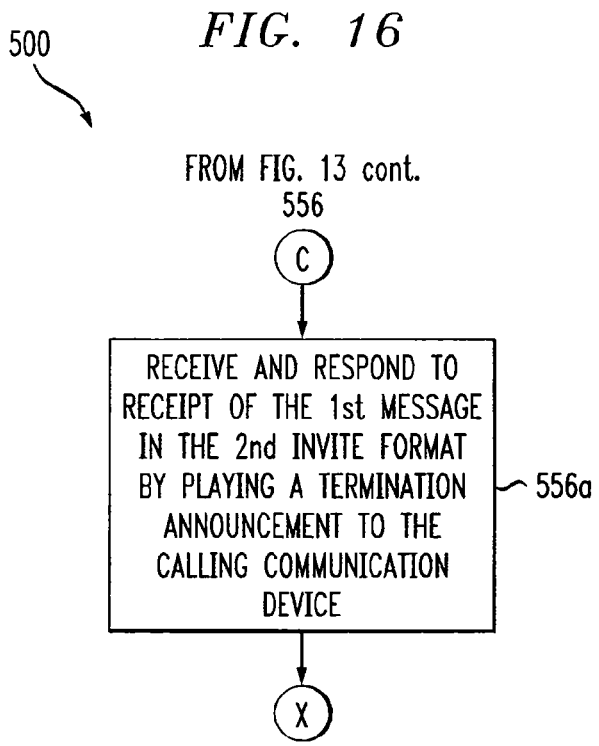

SYSTEM AND METHOD FOR PROVIDING MULTI-MEDIA SERVICES TO COMMUNICATION DEVICES OVER A COMMUNICATIONS NETWORK

RELATED APPLICATION

This application is a continuation of U.S. patent application Ser. No. 10/236,623, filed Sep. 6, 2002, now U.S. Pat. No. 7,254,643, entitled "SYSTEM AND METHOD FOR PROVIDING MULTI-MEDIA SERVICES TO COMMUNICATION DEVICES OVER A COMMUNICATIONS NETWORK" which is a Continuation-In-Part ("CIP") of U.S. patent application Ser. No. 10/216,001, filed on Aug. 8, 2002, now abandoned, entitled "SYSTEM AND METHOD FOR PROVIDING MULTI-MEDIA SERVICES TO COMMUNICATION DEVICES OVER A COMMUNICATIONS NETWORK." This application is related to commonly assigned U.S. patent application Ser. No. 10/236,157, filed Sep. 6, 2002, entitled "SYSTEM AND METHOD FOR PROVIDING MULTI-MEDIA SERVICES TO COMMUNICATION DEVICES OVER A COMMUNICATIONS NETWORK," and U.S. patent application Ser. No. 10/236,654 filed Sep. 6, 2002, entitled "SYSTEM AND METHOD FOR PROVIDING MULTI-MEDIA SERVICES TO COMMUNICATION DEVICES OVER A COMMUNICATIONS NETWORK," all of which are hereby incorporated by reference in their entirety.

FIELD OF THE INVENTION

The present invention relates generally to a system and method for providing communications and multi-media services between a plurality of communication devices over a communications network and, more specifically, to a system and method for processing a plurality of Session Initiation Protocol messages provided by the communication devices.

BACKGROUND

In typical business environments many different types of data can be communicated between a number of different communication devices over various communication networks and/or networked computer systems. The many different types of data can be communicated between the number of different communication devices using a plurality of communication protocols.

Conventional methods for communicating information over Internet-based communication networks can require several Internet Protocols ("IP"), which can be used for transporting media and/or control signal information over the communication network. Typically, a mixture of call control signaling protocols, such as H.323, MGCP, or SIP, are used for communicating control signal information between various components of an IP network communication system. However, compatibility-related issues existing between various control signal protocols, which are used to communicate the control-related information, can often inhibit system performance or even cause system failures due to the complexity and overhead associated with protocol inter-working. Similarly, compatibility-related issues existing between various call service processing protocols, which are used to communicate information for multi-media services, as described above, can also often inhibit system performance, cause system failures and complicate the administration and maintenance of communication networks.

In an effort to standardize protocols for information that is communicated over Internet-based communication networks, as well as over other wide area networks ("WANs"), the Internet Engineering Task Force ("IETF") has been formed. The IETF is a standards group associated with Internet-based protocols and architectures that has defined a Session Initiation Protocol ("SIP") in RFC 2543, which is a protocol for creating, modifying, and terminating multimedia sessions with one or more participants. The SIP, which is incorporated herein by reference, is a relatively simple and efficient protocol that provides a method of transporting both standard and non-standard information in a common framework.

Even though SIP is becoming an increasingly popular protocol for transporting both standard and non-standard information in a common framework over WANs, local area networks ("LANs") hosted by multi-media communication service providers continue to employ proprietary protocols unique to each multi-media communication service provider or non-proprietary protocols (e.g., standard SS7) that are not directly compatible with SIP. Consequently, each multi-media communication service provider operating on a LAN is required to interface with SIP in order to communicate control signals and/or session information over the WAN. As a result, system performance is degraded because relatively complex processing is required to convert information back and forth for communication over either the WAN or the LAN.

Therefore, an unsolved need remains for a system and method for providing a protocol executable over a LAN or WAN that is directly compatible with the SIP in RFC 2543 protocol, which optimizes system performance and overcomes the above-described limitations and deficiencies of the prior art.

SUMMARY OF THE INVENTION

In accordance with principles of the present invention, a system and method is set forth for providing efficient messaging between a plurality of communication devices by permitting direct communication between the plurality of communication devices after an initial communication with a system for processing multi-media service requests having features of the present invention.

In one aspect of the present invention, the system for processing multi-media service requests, which are received from a plurality of communication devices over a communication network, includes at least one processor and a database coupled to the processor. The database stores a plurality of multi-media service applications adapted to interact with the processor, as well as a plurality of records, which can be accessed by the processor. The system further includes at least one media gateway controller coupled to the processor and to the communication network. The system also includes at least one domain name server and at least one media server, which are coupled to the media gateway controller. The media server is further coupled directly to the processor.

In another aspect of the present invention, a method of processing multi-media service requests received at a multi-media service provider computer system is set forth. The method includes receiving a first message in a first format at the media gateway controller from a first one of a plurality of communication devices. The first message in the first format is processed at the media gateway controller and at the processor for generating an instruction message, which is subsequently communicated to the media server. The media server responds to the instruction message by communicating at least one predetermined announcement to the first one of the plurality of communication devices. The first one of the plurality of communication devices responds to receipt of the at least one predetermined announcement by providing predetermined account-information in the first format to the media server. The media server processes the predetermined account-information in the first format to generate a validation message in a second format including the account-information. The processor directly receives the validation message in the second format from the media server, including the account-information, which enables the processor to efficiently and/or rapidly process the account-information and respond to user requests for multi-media services.

In another aspect of the method of processing multi-media service requests, the step of generating the validation message in the second format includes generating a first message in an HTTP format including a Caller-Entered Data parameter having a value set to Validate Caller-Entered Data. The method of processing multi-media service requests further includes processing the first message in the HTTP format at the processor to formulate a second message in the HTTP format. Further, the processor modifies the Caller-Entered Data parameter, which is also included in the second message in the HTTP format, to a value of at least one of: Valid and Connect, Invalid and Re-prompt or Invalid and Disconnect.

In another aspect of the method of processing multi-media service requests, if the second message in the HTTP format is modified to include the Caller-Entered Data parameter having the value of Valid and Connect, the method further includes processing the second message in the HTTP format at the media server to form a multi-media communication session between the first of the plurality of communication devices and a second of the plurality of communication devices. Furthermore, if the second message in the HTTP format is modified to include the Caller-Entered Data parameter having the value of Invalid and Re-prompt, the method further includes processing the second message in the HTTP format at the media server to re-prompt the first of the plurality of communication devices for other user-information. Additionally, if the second message in the HTTP format is modified to include the Caller-Entered Data parameter having the value of Invalid and Disconnect, the method further includes processing the second message in the HTTP format at the media server to disconnect communications between the media server and the first of the plurality of communication devices.

BRIEF DESCRIPTION OF THE DRAWING

The foregoing and other objects of this invention, the various features thereof, as well as the invention itself, can be more fully understood from the following description, when read together with the accompanying drawings in which:

FIG. 2B is an exemplary INVITE message communicated over the system of FIG. 1;

FIG. 15 is a flow chart illustrating further details of the flow chart of FIG. 13; and FIG. 16 is a flow chart illustrating further details of the flow chart of FIG. 13.

DETAILED DESCRIPTION OF THE INVENTION

For purposes of illustration and to facilitate a further understanding of the present invention, described below is a reference to an Intranet- and/or Internet-based communication network and method for communicating data in a predetermined sequence between various components of the network. However, as understood by one skilled in the art, the present invention is not limited to Intranet- and/or Internet-based communication networks and can include systems employing other communication networks, as well as stand-alone systems.

Figure 1:
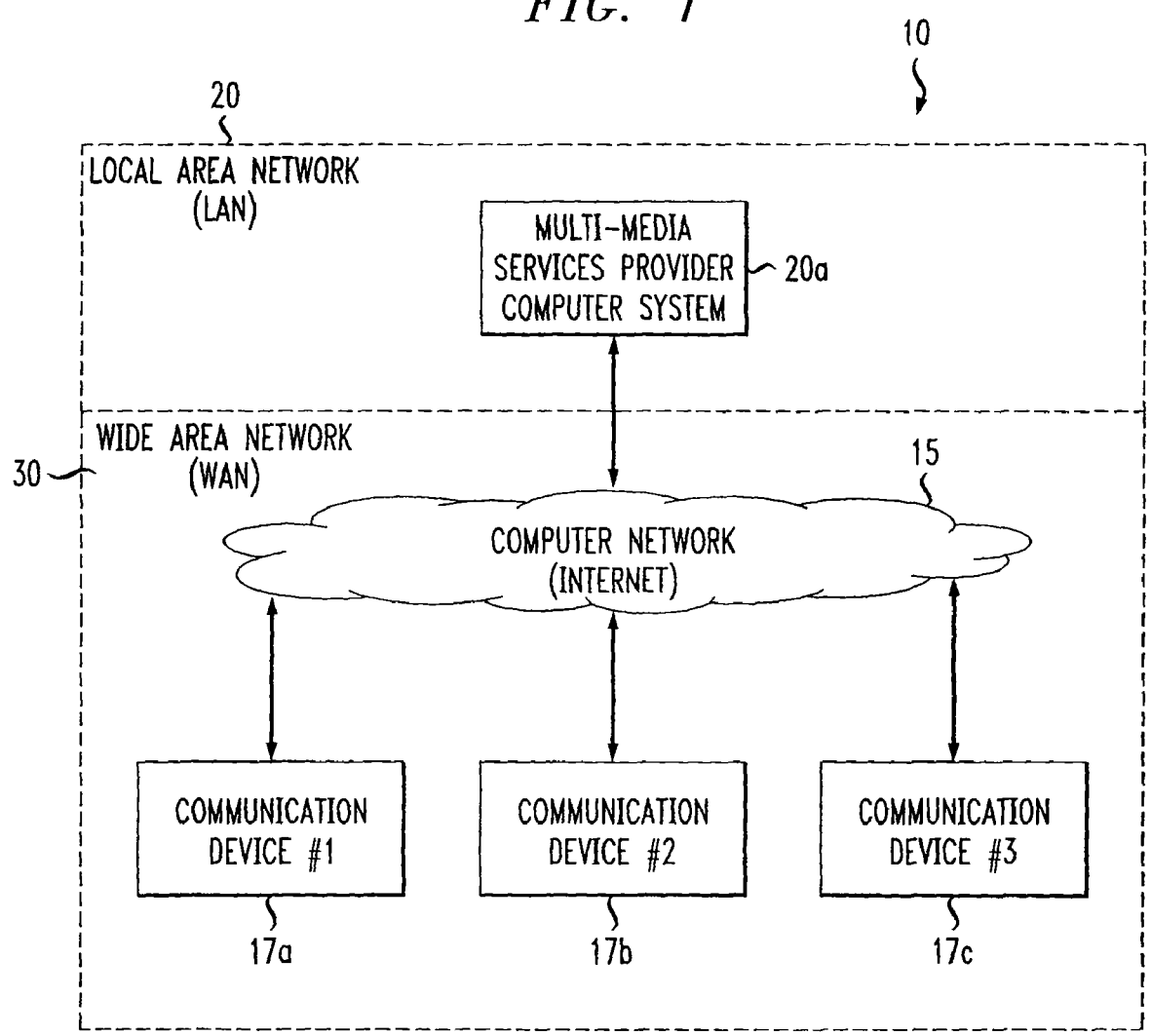
FIG. 1 is a high-level schematic block diagram of a system according to the present invention.

FIG. 1 shows an exemplary system 10 for establishing multi-media communications between a LAN 20 and a WAN 30 in accordance with the present invention. The LAN 20 can include a Multi-Media Services Provider Computer System 20a adapted for receiving and processing client requests for multi-media communication services, which will be discussed in further detail below. The WAN 30 can include a plurality of networked computer systems 15, such as the Internet, which can be coupled to the LAN 20 as well as to a plurality of communication devices 17a, 17b, 17c. The system 10 is suitable for communicating a plurality of control and multi-media messages within each of the LAN 20 and the WAN 30, as well as between the LAN 20 and the WAN 30. The LAN 20, as shown in FIG. 1, is also suitable for interfacing with the WAN 30 using a common protocol, such as SIP in RFC 2543, for receiving and transmitting as well as for processing, storing and retrieving a plurality of control signals and multi-media services. It should be apparent to those skilled in the art that attributes of the WAN 30 can be provided by other systems (not shown), such as a Local Exchange Carrier (LEC), a wireless network, and/or a long distance network to reach the LAN 20.

Figure 2A:
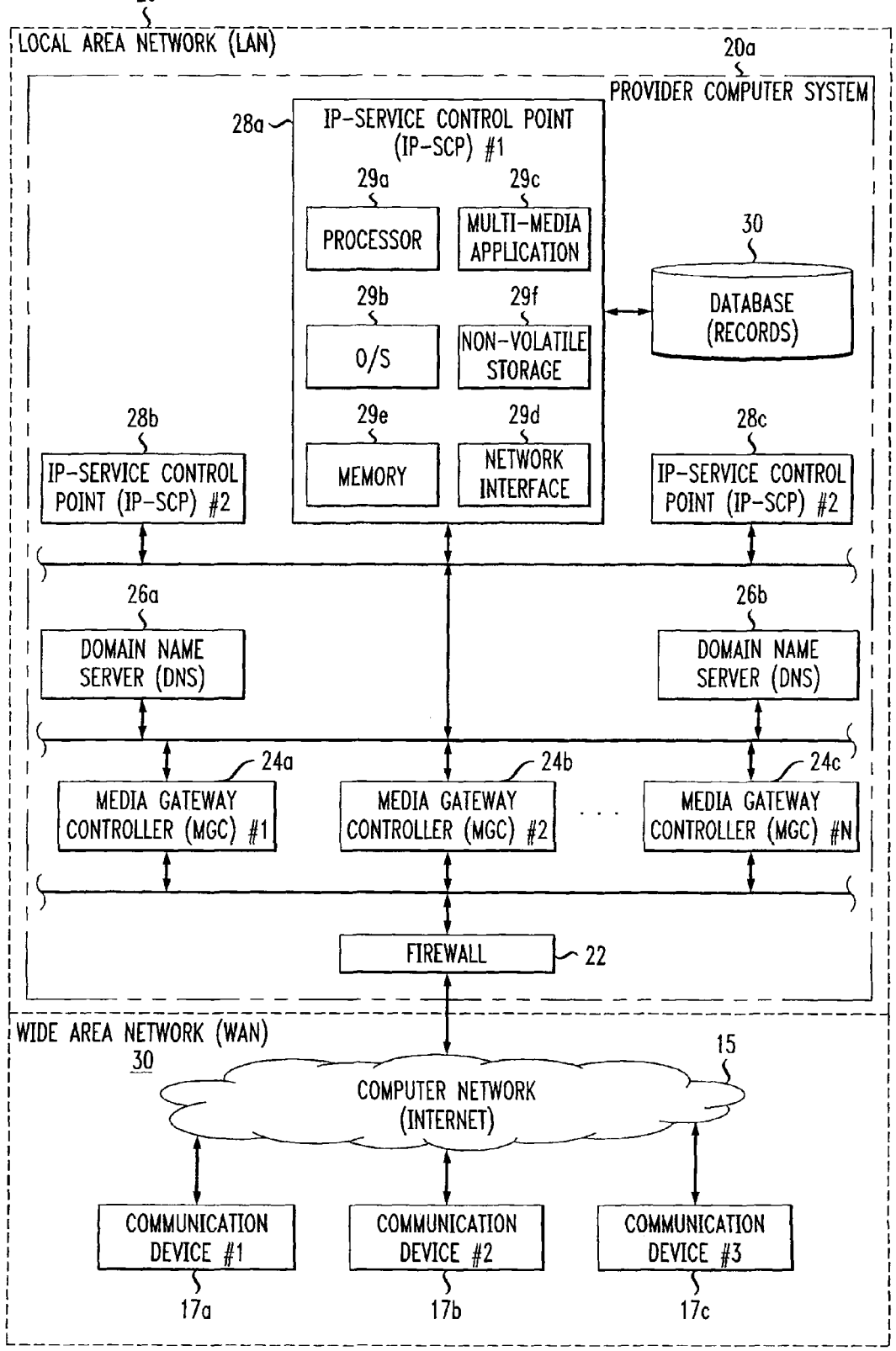
FIG. 2A is an expanded schematic block diagram of the system of FIG. 1.

FIG. 2A shows an expanded schematic block diagram of the Multi-Media Services Provider Computer System 20a located on the LAN 20 of FIG. 1. The Multi-Media Services Provider Computer System 20a includes a firewall 22 coupled between the WAN 30 and a number of Media Gateway Controllers ("MGCs") 24a, 24b, 24c, which serve as proxy servers for multi-media service requests from the WAN communication devices 17a, 17b, 17c. The MGCs 24a, 24b, 24c are further coupled to a number of Domain Name Servers 26a, 26b (which are collectively referred to hereinafter as "DNS 26") and to a number of Internet Protocol Service Control Points (hereinafter referred to as "IP-SCPs") 28a, 28b, 28c or multi-media services application servers. Although only the first IP-SCP 28a is shown to include a database 30, it should be understood that the second and third IP-SCPs 28b, 28c can also include similar databases, which are each adapted to receive and store, as well as retrieve, a plurality of records. The DNS 26 and the IP-SCPs 28a, 28b, 28c are respectively adapted to provide IP addresses and to process multi-media service requests received at the LAN 20 from the communication devices 17a, 17b, 17c, which will be discussed in further detail below.

The WAN communication devices 17a, 17b, 17c can include a plurality of SIP-enabled devices, such as telephones, personal computers, IP-Private Branch Exchanges ("IP-PBXs"). In addition, the communication devices 17a, 17b, 17c can include a plurality of SIP-enabled wireless devices, such as cellular telephones, pagers and personal digital assistants ("PDAs").

In one embodiment, the IP-SCPs 28a, 28b, 28c (which are collectively referred to hereinafter as "IP-SCPs 28") of the Multi-Media Services Provider Computer System 20a of the LAN 20 can each include a conventional computer server, such as an "NT-Server," which can be provided by Microsoft of Richmond, Wash. or a "Unix Solaris Server," which can be provided by Sun Micro Systems of Palo Alto, Calif. These IP-SCPs 28 can be programmed with conventional Web-page interface software such as: "Visual Basic," "Java," "JavaScript," "HTML/DHTML," "C++," "J+," "Perl," or "Perlscript," and "ASP." These IP-SCPs 28 can further be programmed with an operating system, Web server software and Web Application software, such as an e-commerce application and computer network interface software. In addition, the IP-SCPs 28 can be programmed with multi-media service software adapted to provide a plurality of multi-media services, as is known, such as "Click-to-Dial," Video Conferencing," "Virtual Private Networks," and "Toll-Free Calling."

It should be understood that the IP-SCPs 28 located on the Multi-Media Services Provider Computer System 20a of LAN 20 are each similarly constructed and arranged and thu, in order to simplify the description, only a detailed description of a first IP-SCP 28a is described herein. The first IP-SCP 28a can include a processor 29a, an operating system 29b, a plurality of multi-media service applications 29c, such as VPN, Click-to-Chat, Web collaboration and toll free processing, computer network interface 29d, memory 29e and a non-volatile storage medium 29f, such as a magnetic or optical disk drive. Generally, the IP-SCP 28 includes hardware necessary for running software to access the database 30 for processing communication device 17a, 17b, 17c requests, and to provide an interface for routing one or more customer records and identifiers previously stored in the database 30 to the MGCs 24 for establishing communications links between the communications devices 17a, 17b, 17c.

The database 30 associated with each of the IP-SCPs 28 contains a service intelligence layer adapted for providing multi-media services such as Toll-Free, Virtual Private Networks, and various multi-media features like "Click-To-Dial", as similarly described above. The intelligence layer may include customer logic and data, as well as common logic and data that is used by all communication devices or customers.

The IP-SCP 28 may be defined as a SIP Server because the IP-SCP 28 receives requests from the MGC 24, which in this capacity serves as a proxy server, and provides multi-media service processing for requesting communications devices 17a, 17b, 17c. The IP-SCP 28, acting as the SIP server, can receive an INVITE message from the MGC 24. Thereafter the IP-SCP 28 can access the appropriate logic to provide multi-media services feature processing, which is associated with the query. The IP-SCP 28 can add predetermined information to the body of the INVITE message—for example, routing addresses, billing numbers, or announcements.

In one embodiment, the MGCs 24a, 24b, 24c (which are collectively referred to hereinafter as MGCs 24) located on the Multi-Media Services Provider Computer System 20a of the LAN 20 can each include a conventional router, such as a "Cisco 12000," available from Cisco Corporation of San Jose, Calif. Further, each of the MGCs 24 or routing systems can be adapted to run data packet flow statistical software, such as Netflow™ software, also available from Cisco Corporation of San Jose, Calif. Alternatively, each of the MGCs 24, as shown in FIG. 2, can be a softswitch, such as a "HI-Q", available from Siemens Corporation of Woodbridge, N.J.

The data packet flow statistical software, such as Netflow™, running on each of the MGCs 24, as described above, enable each of the MGCs 24 to gather and store data packet flow statistical information. The data packet flow statistical information can include the number of packets that have been communicated between communication devices 17a, 17b, 17c, the duration of communication between each of the communication devices 17a, 17b, 17c, the total number of packets communicated over the LAN 20 (which is typically used for capacity planning), as well as other various data packet flow statistical information. The information obtained from the data packet flow statistical software can also be used to generate billing information for users of the communication devices 17a, 17b, 17c.

The DNS 26, as shown in FIG. 2A, can be provided as a conventional server that is similarly constructed and arranged as the IP-SCP 28, as described above in detail. The DNS 26 is adapted to store and retrieve authoritative information related to host names and their corresponding WAN IP addresses, which is known as the zone of authority. The DNS 26 is adapted to receive and translate the Uniform Resource Locator (URL) received in a Lightweight Directory Access Protocol ("LDAP") query from the MGC 24 to an IP address recognizable to the MGC 24. For example, the MGC 24 sends an LDAP query to the DNS 26 containing a universal resource locator ("URL") associated with communication device 17a. In response to the LDAP query, the DNS 26 sends an LDAP response to the MGC 24 containing an IP address corresponding to the URL associated with communication device 17a. The MGC 24 can also serve as a proxy server because the MGC 24 receives requests from the WAN communication devices 17a, 17b, 17c, SIP endpoints (e.g., destinations), such as SIP-enabled PBXs, and either processes those requests locally or forwards the requests to the IP-SCP 28 for multi-media feature processing.

The MGC 24 further includes a set of triggers that are adapted to initiate queries to the IP-SCP 28 when predetermined conditions are met. The triggers at the MGC 24 may be defined in a manner analogous to the triggers defined at the Service Switching Point (not shown) of the so-called Advanced Intelligent Network ("AIN") Call model. The MGC 24 may have triggers activated by specific digit strings of the destination address or IP address of one of the communication devices 17a, 17b, 17c. The MGC 24 may also set triggers on the origination address associated with the initiating communication device 17a, 17b, 17c, such as the charge number.

FIG. 2B shows one example of an exemplary initial INVITE message 50, which is employed as a set-up message for communications between the communication devices 17a, 17b, 17c. The initial INVITE message 50 can include a header portion 52 and a body portion 54, each having predetermined content. In one embodiment, the header portion 52 can include a "sip-req" portion 52a-a, which is also referred to as a Request-Universal Resource Identifier (Request-URI) and includes address information associated with the destination device (for example, MGC 24 and/or communication device 17b) which may be receiving the initial INVITE message 50 or a processed version thereof, which is described below. The header portion 52 can further include a "Via" portion 52a, "From" portion 52b, "To" portion 52c, "Call ID" portion 52d, "Cseq" portion 52e, "Expires" portion 52f, User-Agent portion 52g, "Accept" portion 52h, "Contact" portion 52i, "Content-Type" portion 52j and a "Content-Length" portion 52k. Although not specifically shown, the header portion 52 can further include a "Subject" portion.

In one embodiment, the body portion 54 of the exemplary initial INVITE message 50 can include at least a "Service Query Flag" portion 54a, "Routing Number" portion 54b, "Original Dialed Number" portion 54c and "Billing Module" portion 54d. The body portion 54 can further include information associated with the media to be exchanged (e.g., G729.a compression) as defined by the Session Description Protocol (SDP), media channel set-up as defined by ISDN User Part (ISUP) of the SS7 protocol, or call control instructions as defined by the Transactions Capabilities Procedure (TCAP) of the SS7 protocol, as described herein.

It should be understood that the initial INVITE message, which is generated by the first or initiating communication device 17a, for example, ultimately is communicated to the second or destination communication device 17b, for example. However, the initial INVITE message can be processed or modified a number of times by various proxies of the Multi-Media Services Provider Computer System 20a (e.g., MGC 24 and/or IP-SCP 28) prior to arriving at the destination communication device 17b, which processing and/or modifications are described herein in connection with exemplary embodiments of the present invention. Further, in the initial INVITE message the Call-ID header and the From header do not change from the beginning of the call flow to end of the call flow.

Before a call (e.g., incoming initial INVITE message) encounters a trigger, the MGC 24 may query the DNS 26 if the destination address in the Request-URI is a SIP URL. More specifically, if the MGC 24 receives a SIP URL, the MGC 24 sends a query to the DNS 26 to translate the SIP URL to an IP address and to provide a copy of the IP address back to the MGC 24, as previously described above. Additionally, before a call encounters a trigger, the MGC 24 may provide screening on the fields in the incoming initial INVITE message, which is used to form a call set-up message. The screening of the initial INVITE message by the MGC 24 can include, for example, the MGC 24 screening the Request-URI of the initial INVITE message. An exemplary Request-URI 52a-a is shown in FIG. 2B, which includes a destination address associated with a recipient device (e.g., MGC 24) of the initial INVITE message 50.

If the communication device 17a, 17b, 17c which initiated the initial INVITE message is located at a Virtual Private Network ("VPN") location that is not permitted to make Toll-Free calls over the VPN connection, then the MGC 24 can block the initial INVITE message with a destination address in the Request-URI equal to a Toll-Free location. In an exemplary embodiment, a VPN is a service offering made by network service providers, such as AT&T, to large businesses with geographically dispersed offices. The VPN service provides features (e.g., private dialing plans) and capabilities of a private network over shared facilities.

In accordance with the present invention, the MGC 24 is further adapted to insert a service query flag in the INVITE message which is received at the MGC 24 from a call initiating communication device 17a, 17b or 17c. Prior to sending the query to an IP-SCP 28, the MGC 24 can populate the INVITE message with a service query flag. In one embodiment, the service query flag is initialized to a first predetermined state, such as "Service Processing Required." The first predetermined state, such as "Service Processing Required," can represent a first processing status of the INVITE message. When the IP-SCP 28 receives and detects the service query flag in the INVITE message, the IP-SCP 28 will refrain from populating its own address in the "Via" field, which is also part of the INVITE message.

When the MGC 24 receives a return INVITE message back from the IP-SCP 28, the MGC 24 checks the value or status of the service query flag. If the value of the service query flag equals a second predetermined state, such as "Service Processing Completed," the MGC 24 determines that the return INVITE message has reached the IP-SCP 28. The second predetermined state, such as "Service Processing Completed," as described herein, can represent a second processing status of the return INVITE message. The MGC 24 uses the information that the IP-SCP 28 populated in the return INVITE message to route and record the call or communication formed between two or more of the communication devices 17a, 17b, 17c. If the value of the service query flag does not equal "Service Processing Completed," the MGC 24 determines that the return INVITE message has not reached the IP-SCP 28. The service query flag allows service processing to take place at the IP-SCP 28. However, the IP-SCP 28 does not populate its address in the "Via" header, so subsequent SIP signaling messages communicated between the initiating and destination communication devices 17a, 17b, 17c are not routed via the IP-SCP 28.

The service query flag can also be used by the MGC 24 to indicate that the MGC 24 has not detected a loop condition, even though the MGC 24 detects its own address in the "Via" header. Additionally, it should be understood that the first and second predetermined states of the service query flag can include a number of different messages and/or instructions representing a number of different attributes associated with the INVITE message.

When the MGC 24 receives a return INVITE message back from the IP-SCP 28 with the service query flag equal to "Service Processing Completed," the MGC 24 performs predetermined processing based on the response from the IP-SCP 28. The predetermined processing can include enabling the MGC 24 to change the value of the service query flag to a third predetermined state, such as "Service Processing Not Required," so that if the message passes through a second MGC 24, the INVITE message will not be sent to a second IP-SCP 28 associated with the second MGC 24. The third predetermined state, such as "Service Processing Not Required," as described herein, can represent a third processing status of the INVITE message. Furthermore, the MGC 24 can insert a "Record-Route" header or destination address into the INVITE message. Finally, the MGC 24 can forward the INVITE message to the destination address specified by the IP-SCP 28.

Any time the MGC 24 receives an INVITE message with the service query flag set to "Service Processing Completed" or "Service Processing Required," the MGC 24 may refrain from adding its address to the "Via" header of this outgoing INVITE message because its address was already inserted when the message was sent to the IP-SCP 28.

Figure 3:
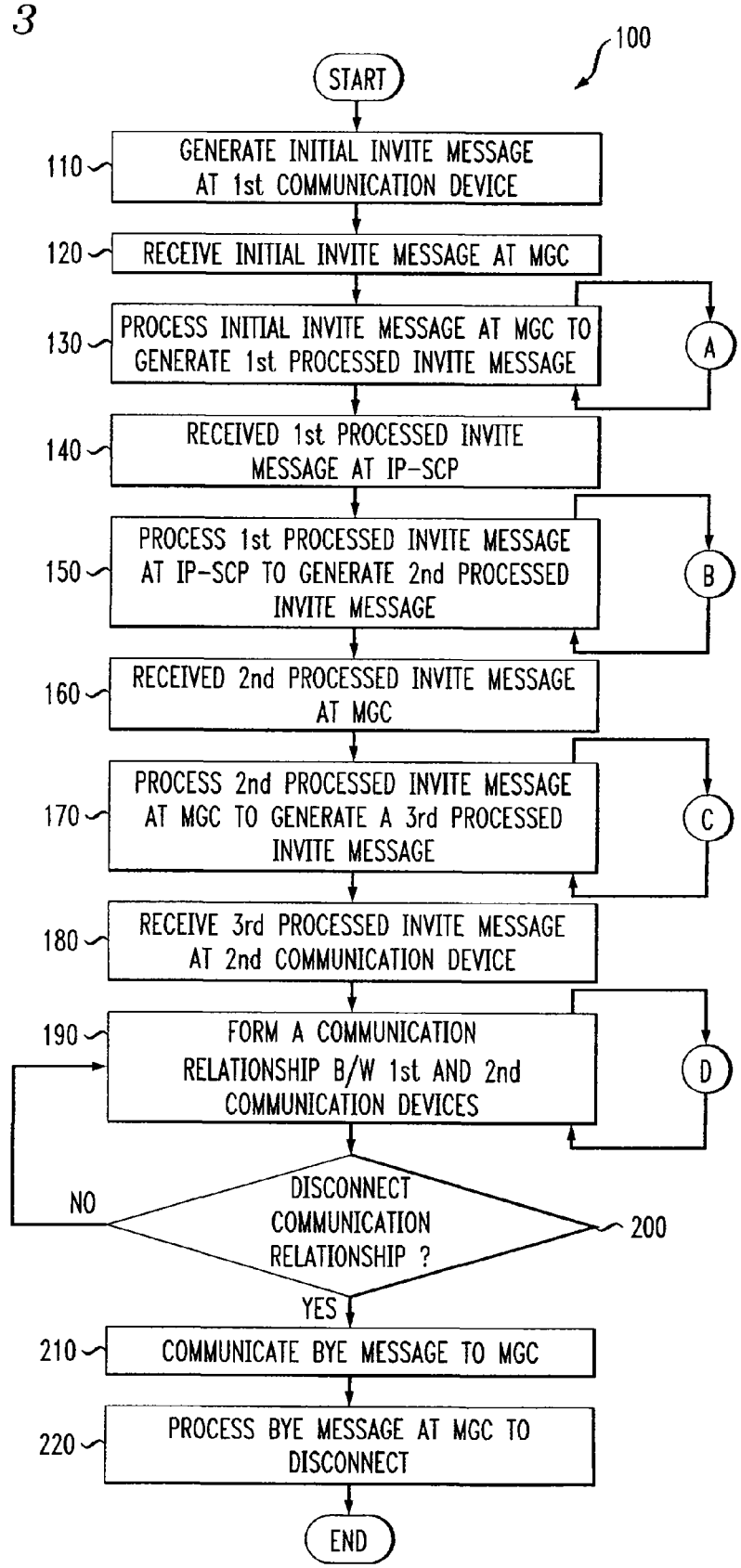
FIG. 3 is a flow chart illustrating process steps executable on the system of FIG. 2A.

FIG. 3 shows an exemplary sequence of steps implementing a method 100 executable on the Multi-Media Services Provider Computer System 20*a* of FIG. 1 for providing multi-media services between a number of communication devices 17*a*, 17*b*, 17*c* in accordance with the present invention. The calling party or initiating communication device 17*a*, 17*b*, 17*c* generates an initial INVITE message, at step 110, by dialing the number for the destination communication device. In a variation of the method, the calling party or initiating communication device 17*a*, 17*b*, 17*c* could generate an INVITE message either by entering a URL or email ID instead of dialing the number of the destination. For example, the calling party can be a first communication device 17*a*. The INVITE message arrives at an optional IP Private Branch Exchange ("IP PBX") 17*a*' (see FIG. 8) which is associated with the first communication device 17*a*. Alternatively, the initial INVITE message could arrive at an access router (not shown) instead of the IP PBX 17*a*'. The initial INVITE message can include a Called Party Number and other such information. The IP PBX 17*a*', which is associated with the first communication device 17*a*, forwards the initial INVITE message to the MGC 24.

Returning to FIG. 3, after receiving the initial INVITE message at the MGC 24 at step 120, the MGC 24 processes the initial INVITE message, at step 130, to generate a first processed INVITE message, which processing is discussed in detail below. The first processed INVITE message is communicated to and received by the IP-SCP 28 at step 140. At step 150, the IP-SCP 28 processes the first processed INVITE message and modifies the message body to generate a second processed INVITE message, which is received back at the MGC 24 at step 160. For example, the IP-SCP 28 can process the first processed INVITE message by modifying the message body to include billing information, routing address information and by changing the service query flag from service processing required to service processing completed. In a further example, the IP-SCP 28 may process the first processed INVITE message by modifying the Request-URI to include a destination address associated with a destination or second communication device, such as the communication device 17*b* (provided the initiating communication device, such as device 17*a*, is authorized to make a call to the second communication device 17*b*).

At step 170, the MGC further processes the second processed INVITE message to generate a third processed INVITE message, which processing is also discussed in detail below. Thereafter, the third processed INVITE message is communicated to and received by, for example, the second communication device 17*b* at step 180. At this instant and at step 190, a communicative relationship is formed between the first or initiating communication device 17*a* and the second or destination communication device 17*b*.

A decision is made, at step 200, as to whether to disconnect the communicative relationship formed between the first 17*a* and second 17*b* communication devices. If a decision is made not to disconnect the communicative relationship, then the communicative relationship is maintained. On the other hand, if a decision is made to disconnect the communicative relationship, at step 210 a BYE message is communicated to the MGC 24 from either of the first 17*a* or second 17*b* communication devices. At step 220, the MGC disconnects the communicative relationship formed between the first 17*a* and second 17*b* communication devices.

Figure 4:
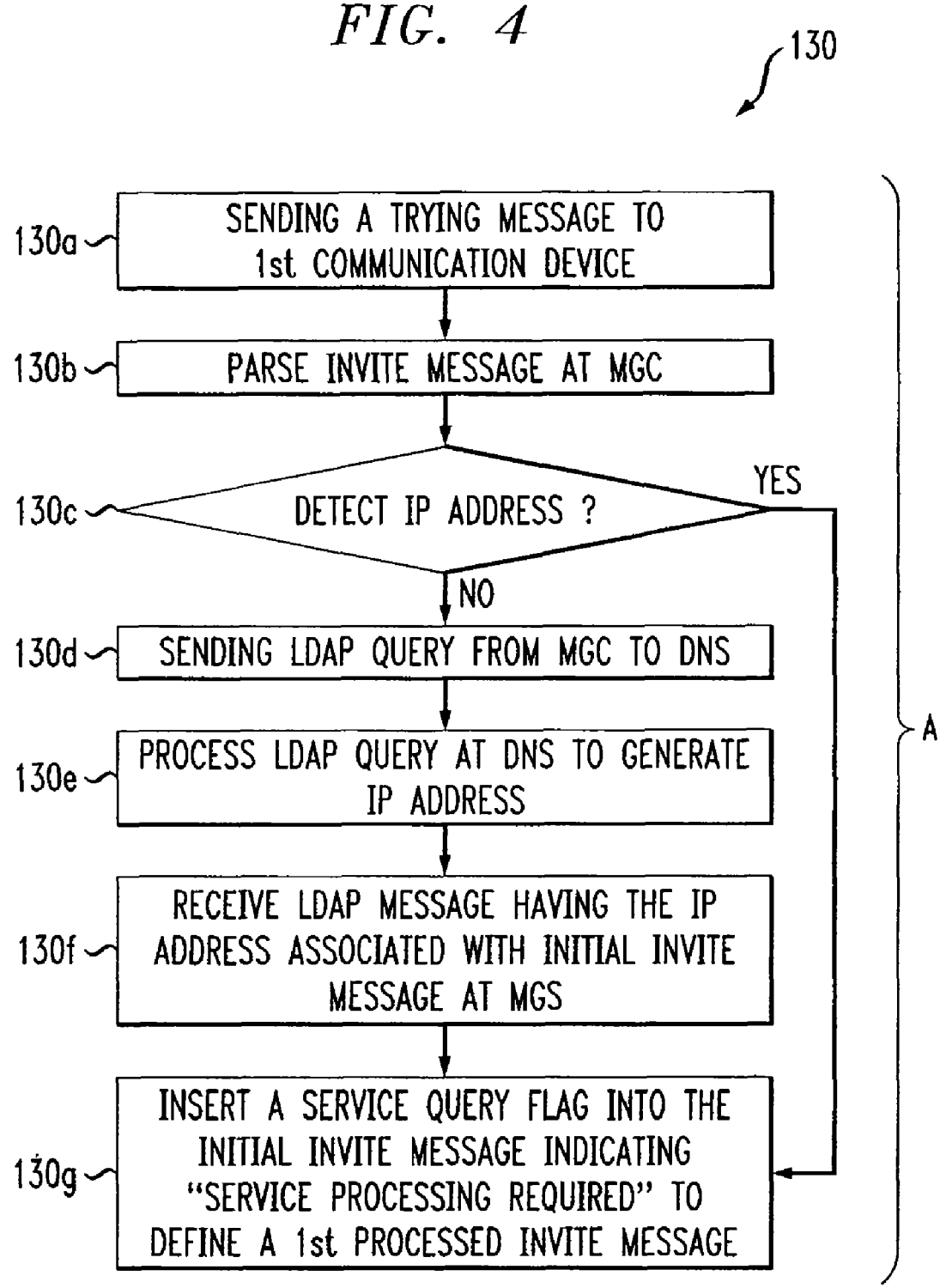
FIG. 4 is a flow chart illustrating expanded process steps of the flowchart of FIG. 3.

Referring further to FIG. 4, shown is a flow chart illustrating further details of step 130 (FIG. 3), which includes processing the initial INVITE message to generate the first processed INVITE message, which is forwarded to the IP-SCP 28. As shown in FIG. 4, step 130 further includes the MGC 24 sending a TRYING message to the IP PBX 17*a*' (FIG. 8), which is associated with the first communication device 17*a*. Furthermore, at step 130*a*, the EP PBX 17*a*' also communicates the TRYING message back to the first (initiating) communication device 17*a*. At step 130*b*, the MGC 24 parses the information contained in the Request-URI header received in the INVITE message. At step 130*c*, if the information contained in the Request-URI does not contain a destination IP address, but instead contains an address in the form of 7324205555@att.com, for example, then at step 130*d*, the MGC 24 sends a LDAP query with predetermined parameters to the DNS 26. In response to the LDAP query, the DNS 26 processes the information contained in the Request-URI, at step 130*e*, to provide an IP address that corresponds to the IP address of the destination communication device 17*b*. Thereafter, the DNS 26 provides an LDAP back to the MGC 24 that includes the IP address of the destination communication device 17*b*.

After receiving the LDAP message, including the IP address of the destination communication device 17*b*, at step 130*f*, the MGC 24 performs pre-query screening and inserts a service query flag with a value of "Service Processing Required" into the initial INVITE message at step 130*g*. Inserting the service query flag with a value of "Service Processing Required" into the initial INVITE message defines the first processed INVITE message, which is subsequently sent from the MGC 24 to the IP SCP 28 without modifying any other information in an exemplary embodiment.

Figure 5:
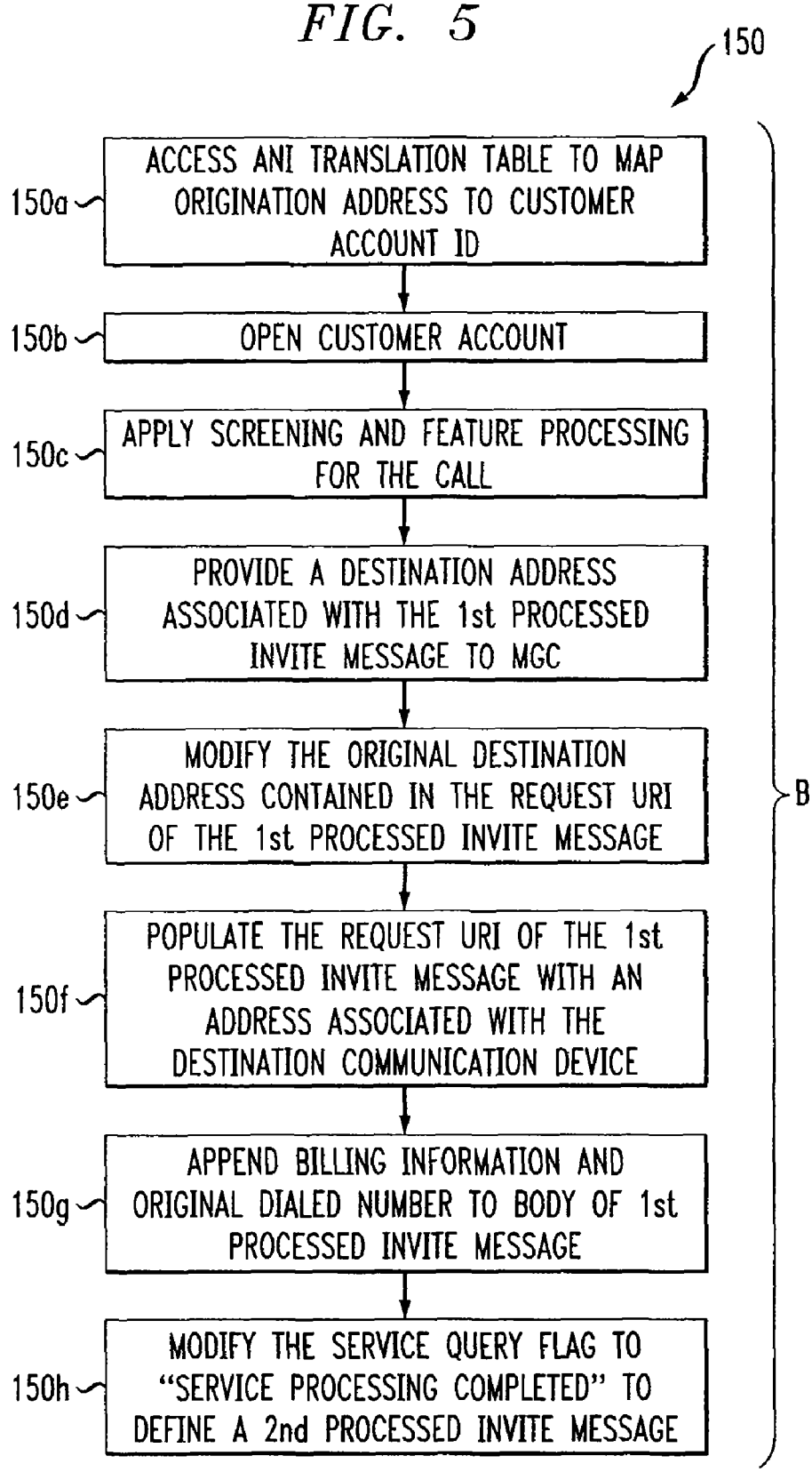
FIG. 5 is a flow chart illustrating expanded process steps of the flowchart of FIG. 3.

FIG. 5 shows further details of step 150 (FIG. 3), which includes processing the first processed INVITE message at the IP-SCP 28 to generate the second processed INVITE message. As shown in FIG. 5, step 150 further includes the IP-SCP 28 accessing an ANI translation table that maps the IP address of the first or initiating communication device, which is the first communication device 17*a* in this example, to a customer account ID, at step 150*a*. Using the customer account ID from the ANI translation table, the IP-SCP 28 application accesses or opens a customer account, at step 150*b*, which is associated with the first or initiating communication device 17*a*. At step 150*c*, attributes realized from the customer account are processed with the first processed INVITE message to provide screening and feature processing for the first processed INVITE message. At step 150*d*, the IP-SCP 28 returns a destination address to the MGC 24, or addresses if the call may be routed to an alternate destination. The destination address may be an IP address, a NANP, an APN formatted number, a URL, or a combination of these addressing schemes. This destination address may be returned in the Request-URI modified by the IP-SCP 28. In this example, the destination address is the IP address of the destination communication device 17*b*.

At steps 150*e* and 150*f*, the IP-SCP 28 modifies the destination address contained in the Request-URI of the first processed INVITE message to include a copy of the address of the destination or second communication device 17*b*. At step 150*g*, the IP SCP 28 also appends predetermined billing information to the body of the first processed INVITE message. At step 150*h*, the IP-SCP 28 modifies the value of the service query flag from "Service Processing Required" to a value of "Service Processing Completed." Modifying the value of service query flag from "Service Processing Required" to a value of "Service Processing Completed" defines a second processed INVITE message. The IP-SCP 28 changes the value in the service query flag in order to notify the MGC 24 that the first processed INVITE message has received service processing, which results in the generation of the second processed INVITE message, as described above in detail.

Thereafter and as discussed above at step 160 (FIG. 3), the MGC 24 receives the second processed INVITE message from the IP-SCP 28. Because the second processed INVITE message, as received by the MGC, contains the service query flag with a value of "Service Processing Completed," the MGC 24 determines that the message has already been sent to the IP-SCP 28 for feature processing. In order to prevent any responses from the destination communication device from being routed via the IP-SCP 28, the address of the IP-SCP 28 is not populated into the "Via" header of the second processed INVITE message. In addition, a value of either "Service Processing Completed" or "Service Processing Required" in the service query flag prevents the MGC 24 from populating its own address again in the "Via" header of the outgoing INVITE message (e.g., third processed INVITE message), which is delivered to the destination communication device 17*b*. In circumventing the IP-SCP 28 and MGC 24 from the communication path formed between the first communication device 17*a* and the second communication device 17*b*, overall system performance is optimized because multi-media communications are executed directly between the first 17*a* and second 17*b* communication devices.

Figure 6:
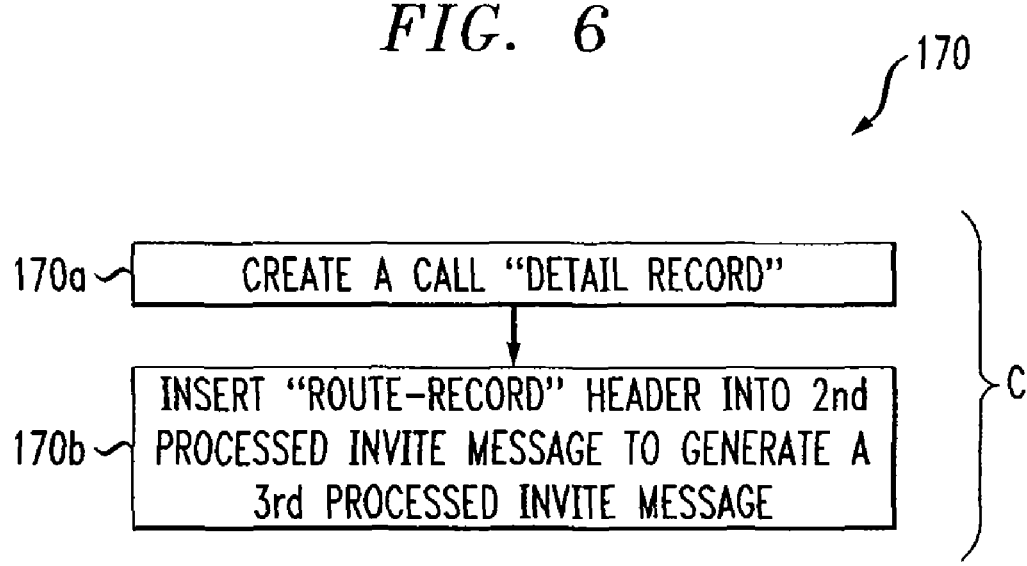
FIG. 6. is a flow chart illustrating expanded process steps of the flowchart of FIG. 3.

Referring now to FIG. 6, there is shown a flow chart illustrating further details of step 170 in FIG. 3, which includes processing the second processed INVITE message at the MGC 24 to generate the third processed INVITE message. As shown in FIG. 6, step 170*a* includes further processing the second processed INVITE message at the MGC 24 using the billing information returned from the IP-SCP 28 to create a Call Detail Record, which is associated with the call or second processed INVITE message. At step 170*b*, the MGC 24 inserts a "Route-Record" header into the second processed INVITE message, which defines the third processed INVITE message. The third processed INVITE message is thereafter forwarded to the second or destination communication device 17*b* either directly or via an IP PBX 17*b*' (FIG. 8) which is associated with the second or destination communication device 17*b*. The third processed INVITE message is ultimately delivered to the second or destination communication device 17*b* based on the IP address populated in the Request-URI of the third processed INVITE message by the IP-SCP 28

Figure 7:
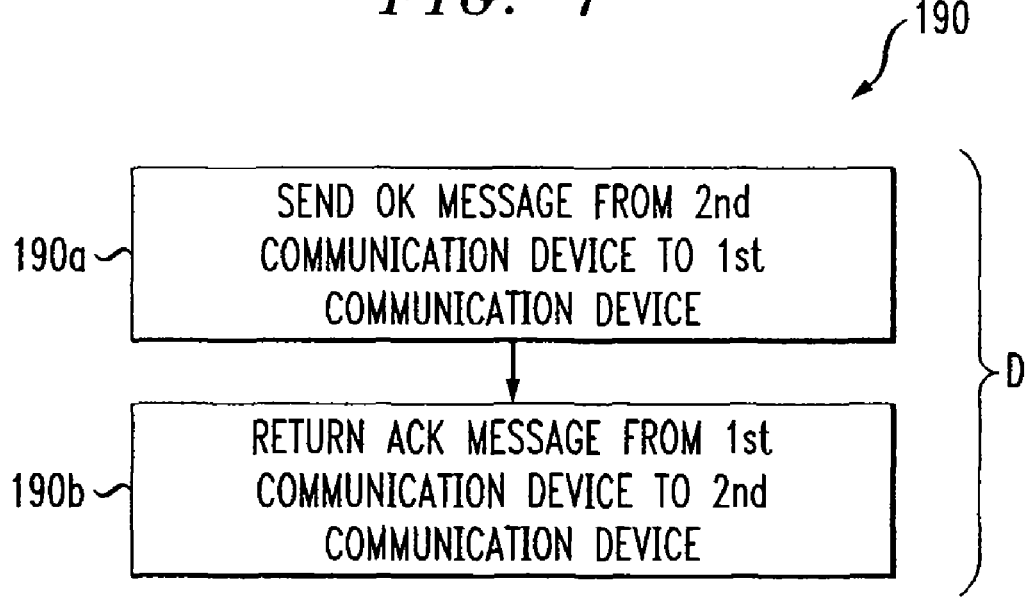
FIG. 7 is a flow chart illustrating expanded process steps of the flowchart of FIG. 3.

FIG. 7 shows further details of step 190 of FIG. 3, which includes forming a communication relationship between the first or initiating communication device 17*a* and the second or destination communication device 17*b*. At this point, the third processed INVITE message has been received at the destination communication device 17*b* from the MGC 24, as discussed above with respect to step 180 of FIG. 3. At step 190*a*, the called party at the destination communication device 17*b* sends an OK message to the calling party at the initiating communication device 17*a*, via the MGC 24. Upon receipt of the OK message, the caller at the communication device 17*a* sends an acknowledgement or ACK message to the called party at the destination communication device 17*b*, at step 190*b*, via the MGC 24. At this point, the multi-media communications path between communication devices 17*a* and 17*b* is established. It should be understood that the OK and ACK messages are communicated between the initiating 17*a* and destination 17*b* communication devices as part of a handshaking protocol, which permits either of the devices 17*a* and/or 17*b* to verify the receipt and/or transmission of information by the devices 17*a* and/or 17*b*.

Figure 8:
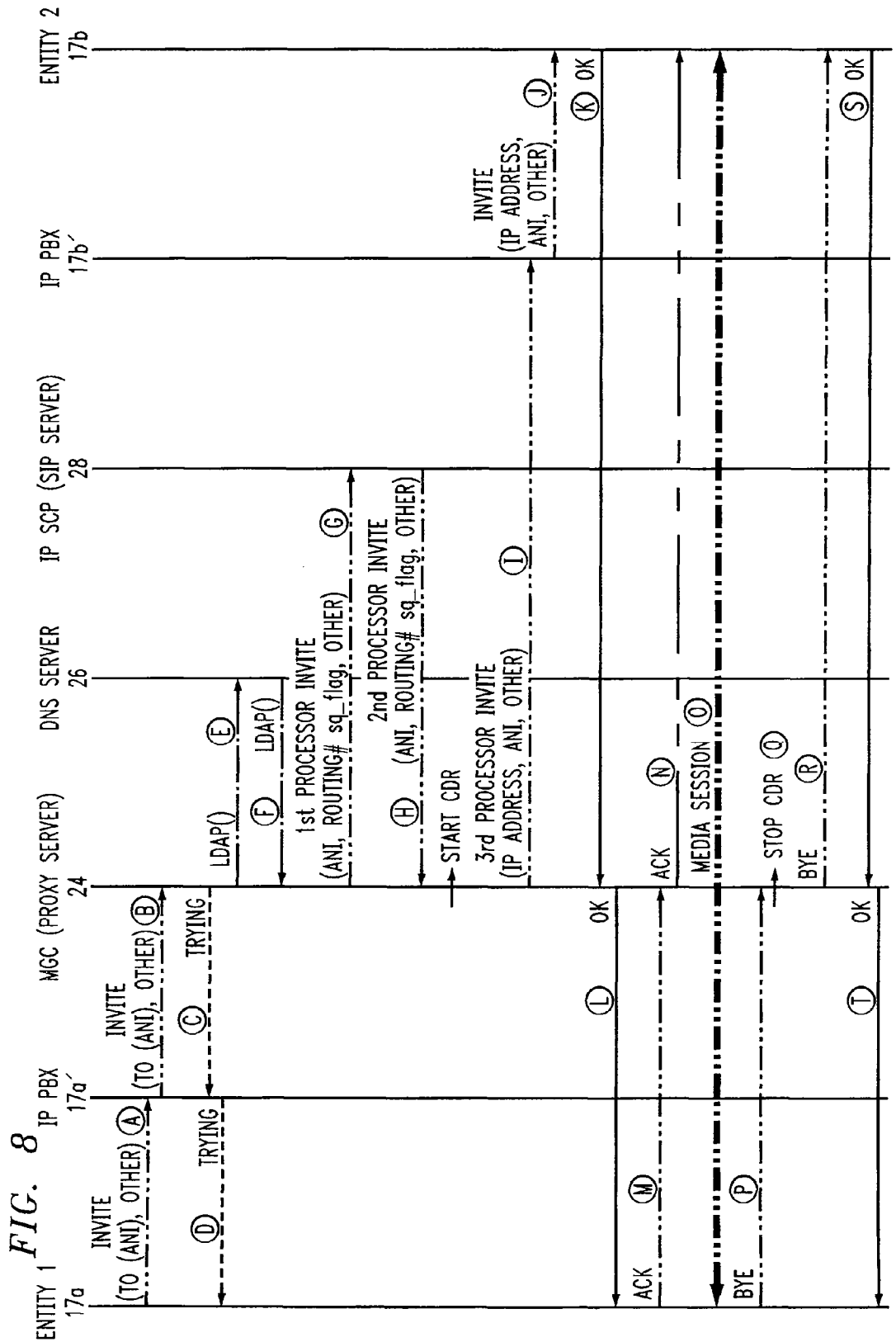
FIG. 8 is an example of a data flow timing diagram related to executing the process steps of FIG. 3 on the system of FIG. 2A to provide multi-media services between a number of communication devices.

When one of the parties using the communication devices 17*a*, 17*b* decides to disconnect multi-media communications, the corresponding device 17*a*, 17*b* sends a BYE message to the other end via the MGC 24 and IP PBX 17*a*' or 17*b*' (FIG. 8). The MGC 24 creates a close Call Detail Record ("CDR") upon receipt of the BYE message. For example, upon receipt of the BYE message at the destination communication device 17*b*, this device 17*b* sends an OK message to the initiating communication device 17*a*, via the MGC 24. At this instant, the multi-media session formed between communication devices 17*a* and 17*b* is disconnected.

Referring now to FIG. 8, there is shown an exemplary call flow diagram for executing the method 100 (see FIG. 3) on the Multi-Media Services Provider Computer System 20*a* of FIG. 1 for providing multi-media services between a number of communication devices 17*a*, 17*b*, 17*c*. The initiating communication device 17*a*, for example, generates and communicates an INVITE message to the MGC 24, at steps A and B, via an optional IP-PBX 17*a*'. The MGC 24 responds to receipt of the INVITE message by communicating a TRYING message (e.g., SIP TRYING message) back to the initiating communication device 17*a*, at steps C and D, via the optional IP-PBX 17*a*'.

Optionally, if the initial INVITE message received at the MGC 24 does not include an IP address associated with the second communication device 17*b*, but rather includes a URL or another destination address identifier for the communication device 17*b*, then the MGC 24 communicates an LDAP query to the DNS 26, at step E, to translate the destination address identifier for the second communication device 17*b* into an IP address. After translating the destination address identifier for the second communication device 17*b* to an IP address, the DNS 26 provides an LDAP back to the MGC 24, at step F, which includes the IP address associated with the second communication device 17*b*.

The MGC 24 further processes the initial INVITE message in accordance with a predetermined process to generate a first processed INVITE message, as described above. The first processed INVITE message is communicated to the IP-SCP 28, at step G. The IP-SCP 28 processes the first processed INVITE message in accordance with a predetermined protocol to generate a second processed INVITE message, which is communicated back to the MGC 24, at step H. After receiving the second processed INVITE message back from the IP-SCP 28, the MGC 24 starts the Call Detail Record ("CDR"), which is used to record a plurality of attributes related to the communication between the communication devices 17*a* and 17*b*—for example, communication start time and end time, video conference and/or virtual private network. The MGC 24 further processes the second processed INVITE message in accordance with predetermined logic to generate a third processed INVITE message, which is communicated to another optional IP-PBX 17*b*', at step I. The IP-PBX 17*b*' can further forward the third processed INVITE message to the second communication device 17*b*, at step J. Upon receipt of the third processed INVITE message, the second communication device 17*b* responds by communicating an OK message to the first communication device 17*a*, via the MGC 24, at steps K and L. Similarly, upon receipt of the OK message, the first communication device 17*a* responds by communicating an ACK message to the second communication device 17*b*, via the MGC 24, at steps M and N. At this instant, a multi-media communication path, e.g., multi-media session, is formed between the first 17*a* and second 17*b* communication devices, at step O.

If the first communication device 17a decides to disconnect the multi-media session, the first communication device 17a communicates a BYE message to the MGC 24, at step P, for which the MGC 24 responds by stopping the CDR, at step Q, and by forwarding the BYE message to the second communication device 17b, at step R. The second communication device 17b responds to receipt of the BYE message by communicating an OK message back to the first communication device 17a, via the MGC 24, at steps S and T. As a result, the multi-media session previously formed between the communication devices 17a and 17b is terminated, at step Q.

In another embodiment, communication services provided by the Multi-Media Services Provider Computer System 20a of FIGS. 1 and 2A, as described above, may be extended to a Public Switched Telephone Network ("PSTN") (not shown). For example, the Multi-Media Services Provider Computer System 20a may be interconnected to the PSTN via the ISUP layer of the SS7 protocol, where the Signaling Transfer Points ("STPs") of the PSTN physically connect with the Signaling Gateways ("SGs") of the Multi-Media Services Provider Computer System 20a.

While INVITE messages for the SIP protocol are shown and described in the exemplary embodiments herein, it should be understood that such messages can be provided in a variety of other protocols and formats without departing from the spirit and scope of the present invention.

Figure 9:
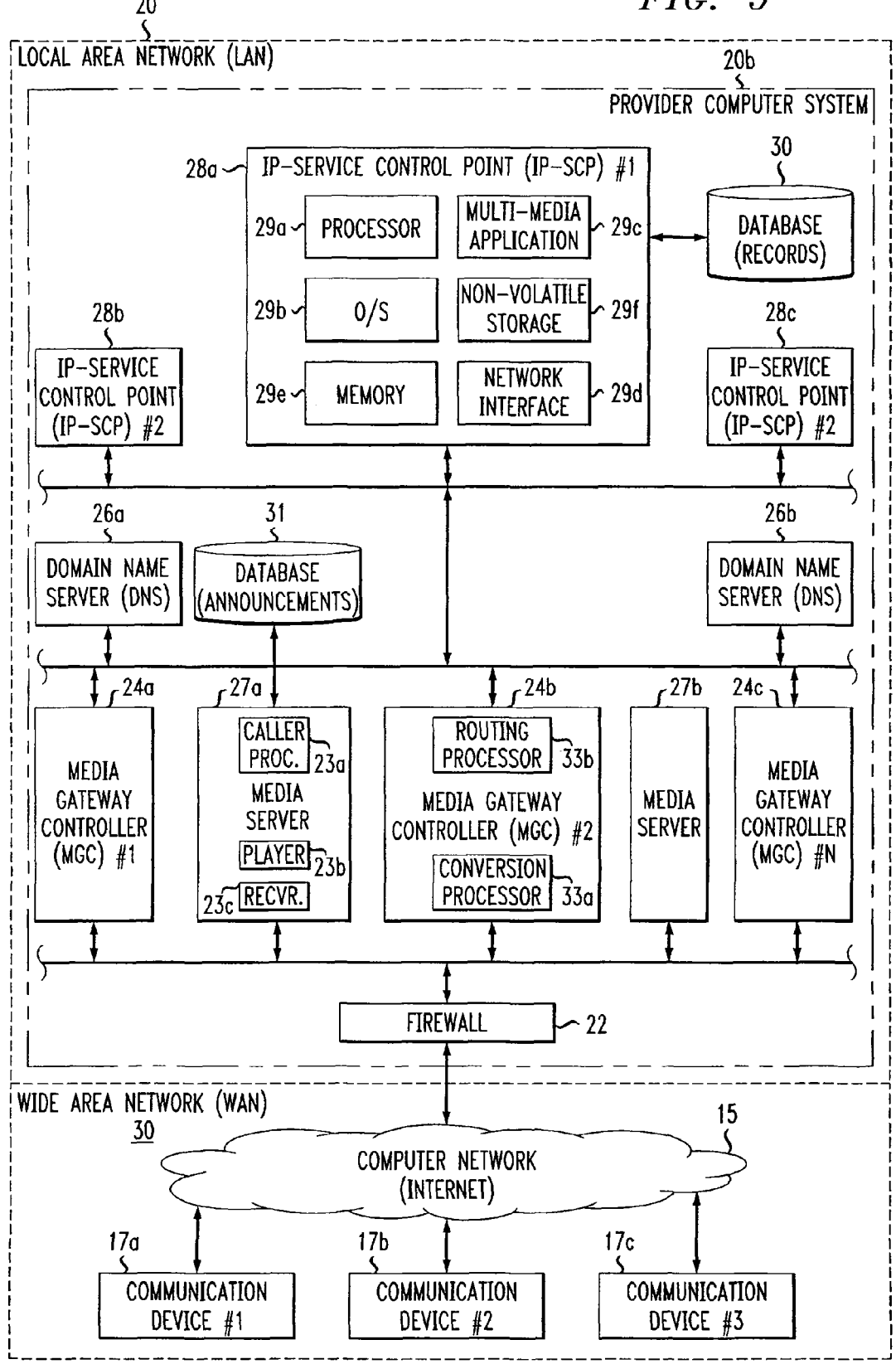
FIG. 9 is another embodiment of an expanded schematic block diagram of the system of FIG. 1.

FIG. 9 shows another embodiment of an expanded schematic block diagram of the Multi-Media Services Provider Computer System 20b, which is similar to the Multi-Media Services Provider Computer System 20a located on the LAN 20 of FIG. 1. In this embodiment, the Multi-Media Services Provider Computer System 20b further includes one or more media servers 27a, 27b, which are adapted to provide interactive multi-media communication with one or more of the communication devices 17a, 17b, 17c. The remaining components in this embodiment are similar to the components shown in FIG. 2A and have similar reference designations.

The media servers 27a, 27b can each include a database 31, which is similar to the database 30 associated with the IP-SCP 28, that is adapted to store a plurality of predetermined announcements. Although an expanded view of the media server 27a is shown in FIG. 9, it should be understood that media server 27b is similarly constructed and arranged. The media servers 27a, 27b can each further include a caller-processor 23a, a player portion 23b and a media receiver portion 23c. The media player portion 23b is adapted to play one or more of the plurality of predetermined announcements to one or more of the plurality of communication devices 17a, 17b, 17c. The media receiver portion 23c is adapted to receive information from the one or more of the plurality of communication devices 17a, 17b, 17c in response to the announcements and to provide the information to the caller-processor 23a. The caller-processor responds to receipt of the information by processing the information to generate a number of messages for communication to other various components of the Multi-Media Services Provider Computer System 20b.

In an embodiment, the media servers 27a, 27b can each be provided as a single server that is similarly constructed and arranged as the IP-SCP 28, which is described in detail above. Alternatively, each of the media servers 27a, 27b can be distributed over a plurality of servers (not shown), which are also similarly constructed and arranged as the IP-SCP 28 described above. In order to simplify the description of the present invention, operation of the Multi-Media Services Provider Computer System 20b will be described in connection with media server 27a (hereinafter referred to as "media server 27") and it should be understood that the Multi-Media Services Provider Computer System 20b can similarly operate with media server 27b or a combination of the media servers 27a, 27b.

Figure 10:
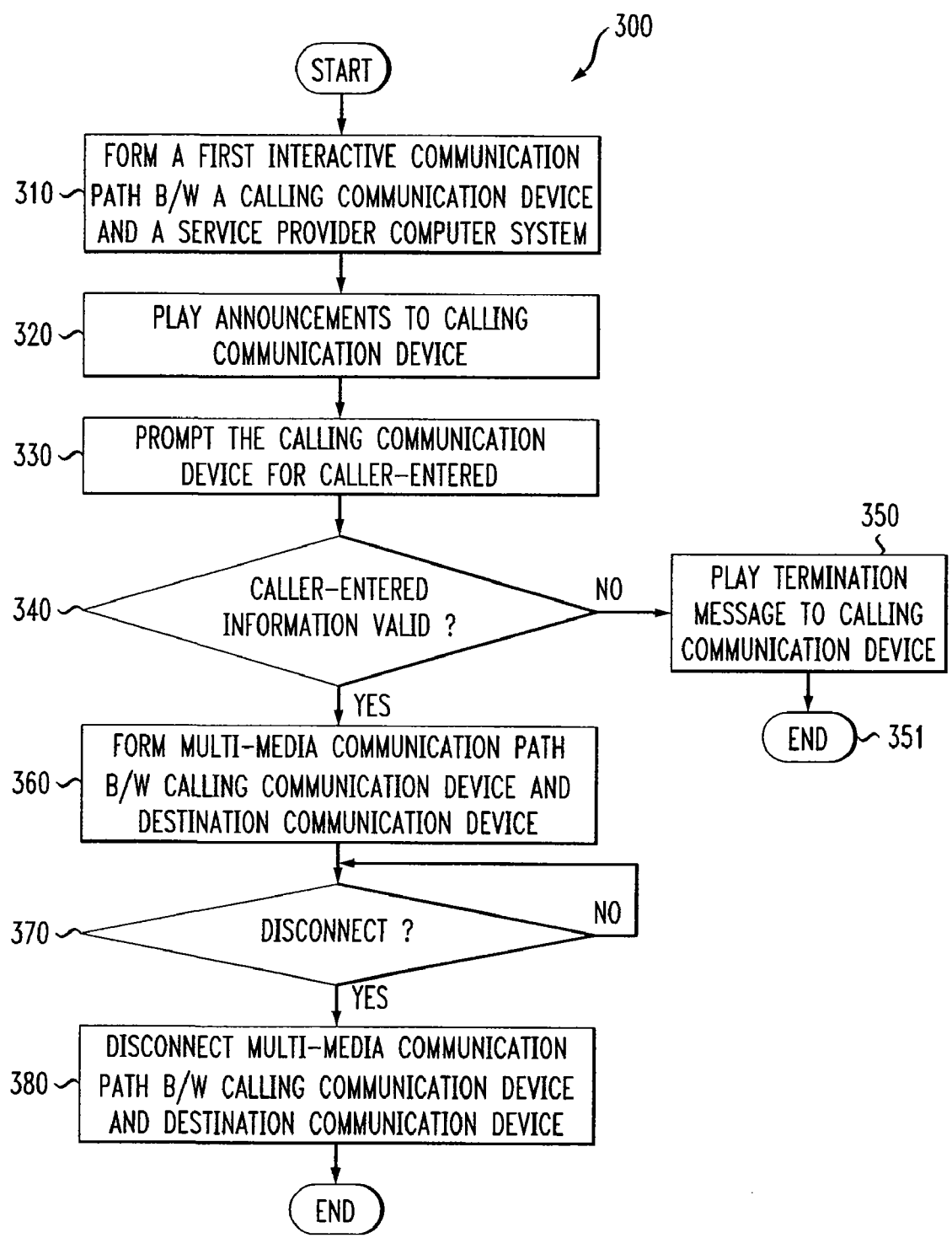
FIG. 10 is a flow chart illustrating process steps executable on the system of FIG. 9.

Referring to FIG. 10 in conjunction with FIG. 9, an embodiment of a method 300 for forming multi-media communications between the Multi-Media Services Provider Computer System and one of or more of the plurality of communications devices 17a, 17b, 17c or between two or more of the plurality of communication devices 17a, 17b, 17c includes forming a first interactive communication path between a calling or first communication device 17a and the Multi-Media Services Provider Computer System 20b, at step 310. Thereafter, at step 320 the Multi-Media Services Provider Computer System 20b may play announcements to the calling or first communication device 17a. Further at step 330, the Multi-Media Services Provider Computer System 20b may prompt the calling or first communication device 17a for information, such as account validation information. At step 340, the Multi-Media Services Provider Computer System 20a can determine if the account validation information provided by the calling or first communication device 17a is valid by comparing the account validation information to pre-stored account records contained in the database 30. If the Multi-Media Services Provider Computer System 20b determines that the account validation information is not valid at step 340, the Multi-Media Services Provider Computer System 20b plays a termination announcement to the calling or first communication device, at step 350, and the method 300 ends at step 351.

On the other hand, if the Multi-Media Services Provider Computer System 20b determines that the account validation information is valid at step 340, then at step 360 the Multi-Media Services Provider Computer System 20b operates to form a multi-media communication path between the calling or first communication device, for example the communication device 17a, and at least one destination or second communication device, for example the communication device 17b. At step 370, users of either the calling or first communication device 17a or the destination or second communication device 17b can elect to disconnect multi-media communications previously formed therebetween. At step 380, the Multi-Media Services Provider Computer System 20b can respond to an election to disconnect by operating to disconnect the communications formed between the calling or first communication device 17a and the destination or second communication device 17b, which is described in detail below.

Figure 11:
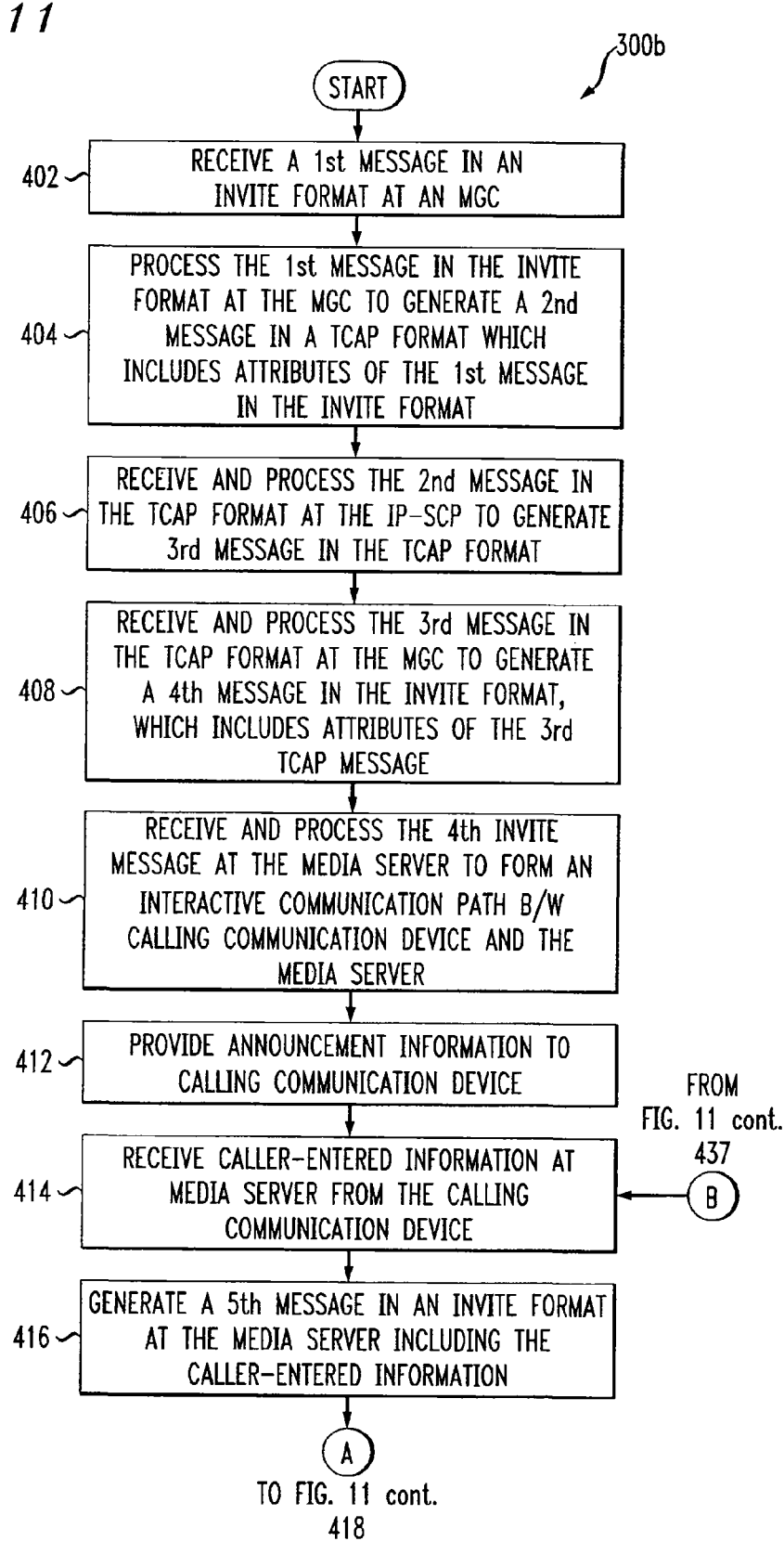
FIG. 11 is a flow chart illustrating expanded process steps of the flow chart of FIG. 10.
Figure 11:
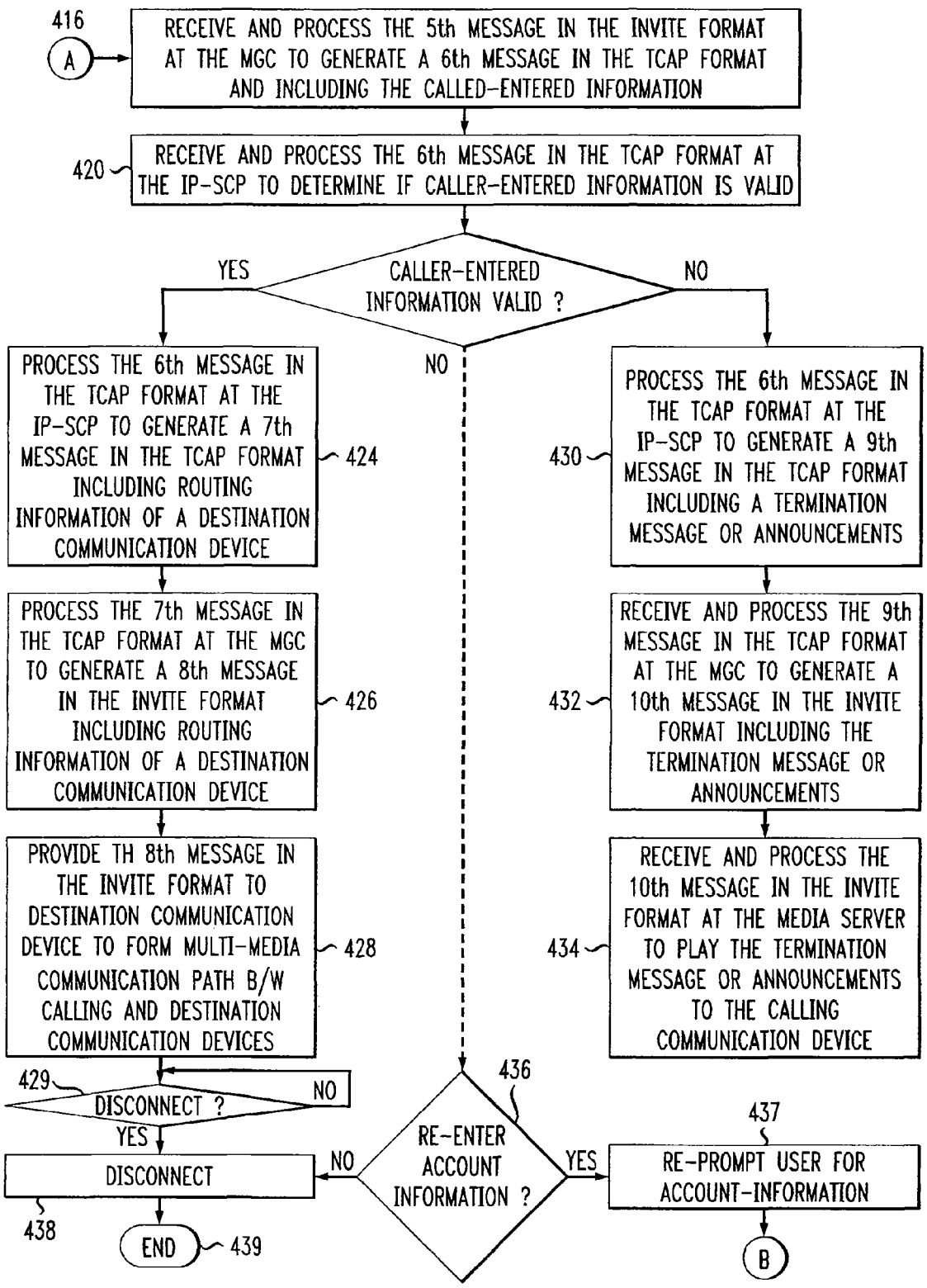

Referring to FIG. 11 in conjunction with FIG. 9, there is shown a further detailed method 300b for executing the above-described method 300 (FIG. 10) for forming multi-media communications between the Multi-Media Services Provider Computer System 20b and one or more of the plurality of communications devices 17a, 17b, 17c, or between two or more of the plurality of communication devices 17a, 17b, 17c.

The method 300b includes generating a first message in a SIP INVITE format (referred to hereinafter as INVITE format) at the calling or first communication device 17a, which first message is received by the MGC 24, at step 402. The MGC 24 responds to receipt of the first message, at step 404, by processing the first message with a conversion processor 33a located on the MGC 24 to generate a second message in an Artificial-Intelligence-Network TCAP format (i.e., AIN TCAP format, referred to hereinafter as "TCAP format"). The processing of the first message in the INVITE format to generate the second message in the TCAP format is described below in detail. The second message in the TCAP format generated at the MGC 24 includes attributes of the first message generated in the INVITE format. The second message in the TCAP format is provided from the MGC 24 to the IP-SCP 28 for feature processing, which processing is also described below in detail. At step 406, the IP-SCP 28 receives and processes the second message in the TCAP format to generate a third message in the TCAP format, which includes predetermined content. The predetermined content included in the third message can include, for example, prompts or solicitations for customer account information, pin numbers (PIN) or customer identifiers. The third TCAP message generated by the IP-SCP 28 is thereafter communicated back to the MGC 24. At step 408, the MGC 24 responds to receipt of the third message in the TCAP format by processing the third message to generate a fourth message in the INVITE format, which includes the predetermined content of the third message defined in the TCAP format, which as described above can include the prompts or solicitations for customer account information, PIN or customer identifiers.

At step 410, the media server 27 receives and processes the fourth message in the INVITE format, which includes the predetermined content, as described above, to form an interactive communication path between the calling or first communication device 17a and the media server 27. The processing of the fourth message in the INVITE format is also described below in detail. At step 412, the media server 27 provides or plays announcement information, such as the predetermined content of the fourth message, to the calling or first communication device 17a. The calling or first communication device 17a may respond to the receipt of the announcement information by providing account-information or caller-entered information to the media server 27, at step 414. In one embodiment, the account-information provided by the calling or first communication device 17a can include an account PIN number, password or an account identifier.

At step 416, upon receiving the account-information or caller-entered information from the calling or first communication device 17a, the media server 27 generates a fifth message in the INVITE format receives, which includes the account-information. Thereafter, the media server 27 communicates the fifth message, including the account-information, to the MGC 24. At step 418, the MGC receives and processes the fifth message in the INVITE format including the account-information to generate a sixth message in the TCAP format, which also includes the account-information. Thereafter, the sixth message in the TCAP format is communicated to the IP-SCP 28. The IP-SCP 28 includes a validation processor that is adapted to receive and process the sixth message in the AIN TCAP format including the caller-entered information to validate the caller-entered information and to generate a seventh message in the AIN TCAP format including routing information associated with at least a second communication device of the plurality of communication devices, which will be described further below.

At this point, it should be understood that the fifth message in the INVITE format is employed as a vehicle for communicating the account-information to the MGC 24 and the sixth message in the TCAP format is employed as a vehicle for communicating the account-information from the MGC 24 to the IP-SCP 28. In accordance with aspects of the present invention, communications between the MGC 24 and media server 27 can be carried out using various messages formulated in the INVITE format, which are directly compatible with protocols used over the wide area network 30. Furthermore, communications between the MGC 24 and IP-SCP 28 can be carried out using various messages formulated in the TCAP format, which are directly compatible with protocols used over the local area network 20.

After receiving and processing the sixth message in the TCAP format at the IP-SCP 28, at step 420, which includes the account-information initiated by the calling or first communication device 17a, the IP-SCP 28 can determine whether the account-information is valid. At step 422, if the IP-SCP 28 determines that the account-information provided by the calling or first communication device 17a is valid, the IP-SCP 28 further processes the sixth message to generate a seventh message, at step 424, which is also in the TCAP format. The seventh message can include routing information associated with a destination or second communication device 17b. The seventh message is thereafter communicated to the MGC 24.

The MGC 24 includes a routing processor 33b that is adapted to receive and process the seventh message in the AIN TCAP format to generate an eighth message in the SIP INVITE format, which is communicated to the second communication device to form a multi-media communication path between the first communication device and the second communication device of the plurality of communication devices. More specifically, at step 426, the seventh message is processed at the MGC 24 to generate an eighth message in the SIP INVITE format, which also includes the routing information associated with the destination or second communication device 17b. At step 428, the eighth message is communicated to the destination or second communication device 17b to form a multimedia communication path between the calling or first communication device 17a and the destination or second communication device 17b.

On the other hand, if the IP-SCP 28 determines, at step 422, that the account-information provided by the calling or first communication device 17a is not valid, then at step 430, the IP-SCP 28 processes the sixth message to generate a ninth message in the TCAP format, which can include a termination message or announcements. The ninth message is thereafter provided to the MGC 24. At step 432, the MGC 24 processes the ninth message in the TCAP format to generate a tenth message in the INVITE format, which can also include the termination message or announcements. Thereafter, the tenth message is communicated to the media server 27. At step 434, the media server 27 receives and processes the tenth message in the INVITE format by playing the termination message or announcements to the calling or first communication device 17a.

If at step 436, a user of the calling or first communication device elects 17a to re-enter account-information, the method 300b further includes re-prompting the user for account-information, at step 437, and redirecting the method 300b back to step 414. On the other hand, if the user of the calling or first communication device 17a elects not to re-enter account-information at step 436, the media server can disconnect further communications with the calling or first communication device 17a, at step 438, and the method ends at step 439.

The above-described step 404 of processing the first message in the INVITE format at the MGC 24 to generate the second message in the TCAP format more specifically includes filtering the first message using a predetermined set of filters. For example, the predetermined set of filters can include a set of AIN TCAP triggers that are supported by the MGC 24 to filter the first message to formulate the second message in the TCAP format. The AIN TCAP triggers located at the MGC 24 adhere to the triggers defined at the Service Switching Point (SSP) of the AIN Call model. The MGC 24 may have AIN TCAP triggers activated by specific digit strings of the destination address of the first message received at the MGC 24. The MGC 24 may set AIN TCAP triggers also on the origination address of the calling or first communication device 17a, such as a charge number.

Before the first message (e.g., call message) encounters a trigger, the MGC 24 may query the DNS 26 if the destination address in the "To" header is a SIP URL. If the destination address in the "To" header is a SIP URL, the MGC 24 sends a query to the DNS 26 to translate the SIP URL to an IP address, as described in detail above. In addition, before a call message encounters an AIN TCAP trigger, the MGC 24 may provide pre-screening on the various fields in first message. For example, the MGC 24 may screen the "To" header of the first message. If the calling or first communication device 17a is an SDN location that is not permitted to make a Toll-Free call over the SDN connection, the MGC 24 blocks the calling or first communication device 17a from making the Toll-Free call.

After receiving the DNS 26 query response, and if the call message meets the appropriate AIN TCAP trigger criteria, the MGC 24 populates the information it received in the first message in the INVITE format, such as a collected address parameter, into the second message in the TCAP format. In an embodiment, the second message in the TCAP format can be defined as an "Info-Collected" message. If the collected address located in the Info-Collected message is a 10-digit number, then the NPT=ISDN and the NoN=National; and if the prefix is 011, then the NoN=International and the NPT=ISDN. The terms NPN and NoN, for example, may be associated with the number described above. Further, in telephony, there are different numbering plans—like private, international and national—which permit interaction between telephones and computers using a multiplicity of combinations of 10-digit numbers.

In one embodiment, the second message in the TCAP format or Info-Collected message, which is provided to the IP-SCP by the MGC, can include at least the following information:

Package Type=Query with Permission to Release
Component Type=Invoke(Last)
Operation=infoCollected
Parameters
  ChargeNumber
  CallingPartyID
  Carrier
  CollectedAddressInfo The above-described terms, which are included in the exemplary Info-Collected message, are defined in Telecordia Technologies Generic Requirements GR-1299-CORE, AINGR: Switch-Service Control Point (SCP)/Adjunct Interface, Issue 7, November 2001.

The above-described step 406 of receiving and processing the second message in the TCAP format at the IP-SCP 28 to generate the third message in the TCAP format more specifically includes executing the appropriate customer logic, which is associated with a user's account located at the IP-SCP 28, to process the Info-Collected message (e.g., second message in the TCAP format). The customer logic applies appropriate screening and feature processing for the Info-Collected message to, for example, instruct the IP-SCP 28 to play an announcement and collect digits associated with the user's account. The IP-SCP 28 uses the customer logic to generate the third message in the TCAP format, which is subsequently sent back from the IP-SCP 28 to the MGC 24. In an embodiment, the third message in the TCAP format is defined as a "Send-To-Resource" message and includes at least the following information:

Package Type=Conversation with Permission to Release
1. Component Type=Invoke(Last)
Operation=SendToResource
Parameters
  ResourceType=FlexParameterBlock
  StrParameter Block=FlexParameterBlock
  IPResourceType=PlayAnnouncements & Collect-Digits
  IPStrParameterBlock=AnnouncementDigiBlock
  Destination Address=MS IP address
2. Component Type=Invoke(last)
Operation=Furnish_AMA The above-described terms, which are included in the exemplary Send-To-Resource message, are defined in Telecordia Technologies Generic Requirements GR-1129-CORE, AINGR: Switch-Intelligent Peripheral Interface (IPI), Issue 5, November 2000.

After sending the above-described third message in the TCAP format or Send-To-Resource message to the MGC 24, the IP-SCP 28 leaves the transaction open while awaiting a response from the MGC 24. Further, the IP-SCP 28 may start a timer and will close the transaction upon the timer's expiration if the IP-SCP 28 does not receive a response to the third message in the TCAP format or Send-To-Resource message from the MGC 24. If the IP-SCP 28 receives a response to the third message in the TCAP format or Send-To-Resource message from the MGC 24 after the timer expires, the IP-SCP 28 ignores the response and takes no further action.

The above-described step 408 of receiving and processing the third message in the TCAP format (e.g., Send-To-Resource message) at the MGC 24 to generate the fourth message in the INVITE format more specifically includes generating the fourth message in the INVITE format with a destination address equivalent to the destination address in the "To" field or "Destination Address" field of the Send-To-Resource message, which is the address of the media server 27. The MGC 24 establishes a mapping between (1) the AIN TCAP transaction currently open with the IP-SCP 28 (i.e., prior to timing out the timer) and (2) the SIP session also currently open with the media server 27. This permits the MGC 24 to map attributes of the various messages in the TCAP format, which are communicated between the MGC 24 and the IP-SCP 28, to the appropriate messages in the INVITE format communicated between the MGC 24 and the Media Server 27. The MGC 24 further populates the message body of the fourth INVITE message with predetermined information such as ResourceType=FlexParameterBlock and StrParameter Block=FlexParameterBlock, which the MGC 24 received in the Send-To-Resource message from the IP-SCP 28.

In one embodiment, a body portion of the fourth message in the INVITE format, which is communicated from the MGC 24 to the media server 27, can include the following information:

"To" field containing the IP address of the MS;
"From" field containing the IP address of the MGC;
SDP of the first INVITE message mapped to the SDP of the second INVITE message; and
Instructions to play the announcement associated with the given announcement ID.

Since the MGC 24 maintains the call state, the MGC 24 inserts a Record-Route header into the fourth INVITE message to ensure that all subsequent messages communicated by either the Media Server 27, IP-SCP 28 or the communication devices 17a, 17b, 17c are sent, via the MGC 24. Further, the MGC 24 creates a Call Detail Record ("CDR") for the call, which CDR is described elsewhere herein.

The above-described step 410 of receiving and processing the fourth message in the INVITE format at the media server 27 to form an interactive communication path between the calling or first communication device 17*a* and the media server 27 more specifically includes the media server 27 responding to receipt of the fourth message by returning a 183-Session Progress and associated SDP information to the MGC 24. In an exemplary embodiment, the SDP information is used for communication capabilities exchange between the first 17*a* and second 17*b* communication devices.

Upon receiving the 183-Session Progress and associated SDP information, the MGC 24 sends the 183-Session Progress message to the calling or first communication device 17*a* with the SDP information, which was received from the media server 27. The calling or first communication device 17*a* acknowledges the 183-Session Progress message with a Provisional Response Acknowledgement (PRACK) message, which is provided to the MGC 24. The PRACK message is operative to ensure that provisional responses are acknowledged reliably. Upon receiving the PRACK message, the MGC 24 sends the PRACK message to the media server 27. The media server 27 returns a 200-OK message, via the MGC 24, to the calling or first communication device 17*a*. At this instant, the calling or first communication device 17*a* and the media server 27 can communicate with each other for resource reservation using a Resource Reservation Protocol-Traffic Engineering protocol (RSVP-TE).

After resource reservation, the calling or first communication device 17*a* sends a COMET message to the media server 27 confirming successful resource reservation, as described above. In the exemplary embodiment, the COMET message is a SIP message that is operative to ensure that any preconditions are satisfied prior to forming a multi-media path between the first 17*a* and second 17*b* communication devices. Upon receipt of the COMET message, the media server 27 sends a 200-OK message to the calling or first communication device 17*a*, via the MGC 24, in response to the COMET message. The media server 27 further sends a 180-Ringing message to the calling or first communication device 17*a*, via the MGC 24. The calling or first communication device 17*a* sends a PRACK message to the media server 27, via the MGC 24, in response to the 180-Ringing message received from the media Server 27. The media server 27 sends a 200-OK message to the calling or first communication device 17*a*, via the MGC 24, in response to the PRACK message. Thereafter, the media server 27 sends a 200-OK message to the MGC 24 in response to receipt of the second INVITE message received from the MGC 24, as described above.

Upon receipt of the 200-OK message at the MGC 24 from the media server 27, the MGC 24 sends a 200-OK message to the SIP INVITE message, which was previously received from the calling or first communication device 17*a*. The calling or first communication device 17*a* thereafter sends an ACK message to the media server 27. It should be understood that the above-described handshaking-communications between the calling or first communication device 17*a* and the media server 27, via the MGC 24, forms a call leg between the calling or first communication device 17*a* and the MGC 24, and a call leg between the MGC 24 and the media server 27. Furthermore, a media session is formed directly between the calling or first communication device 17*a* and the media server 27 (i.e., not through the MGC 24). Therefore, at this instant, a media path for supporting a media session is formed between the calling or first communication device 17*a* and the media server 27.

The above-described step 412 of providing announcement information to the calling or first communication device 17*a* from the media server 27 more specifically includes the media server 27 playing announcements to the calling or first communication device 17*a* based on a predetermined announcement identifier (ID).

The above-described step 414 of receiving account-information at the media server 27 from the calling or first communication device 17*a* more specifically includes the media server 27 collecting a user authorization code, such as a numerical or alpha-numerical PIN number and/or password. Furthermore, the above-described step 416 of generating a fifth message in the INVITE format, including the account-information, more specifically includes the media server 27 formatting the characters associated with the account-information, which was received from the calling or first communication device 17*a*, and populating the account information into the fifth message. In an embodiment, the fifth message in the INVITE format, including the account-information, is defined as a first INFO message. Thereafter, the fifth message or first INFO message is communicated from the media server 27 to the MGC 24.

The above-described step 418 of receiving and processing the fifth message in the INVITE format or first INFO message, which includes the account-information, at the MGC to generate the sixth message in the TCAP format more specifically includes the MGC 24 mapping the account-information, as well as other predetermined information, from the fifth message or first INFO message to a sixth message in the TCAP format. In an embodiment, the sixth message in the TCAP format is defined as a Call-Info-From-Resource message, which is also formed in the TCAP format. The sixth message or Call-Info-From-Resource message can thereafter be communicated to the IP-SCP 28. In an embodiment, the sixth message or Call-Info-From-Resource message can include at least the following information:

Package Type=Conversation with Permission to Release
   Component                   Type=Invoke(Last)
     Operation=CallInfoFromResource
   Parameters
     ResourceType=IPReturnBlock
     IPCollectedoigits The above-described terms, which are included in the exemplary Call-Info-From-Resource message, are defined in Telecordia Technologies Generic Requirements GR-1129-CORE, AINGR: Switch-Intelligent Peripheral Interface (IPI), Issue 5, November 2000.

The above-described step 420 of receiving and processing the sixth message or Call-Info-From-Resource message at IP-SCP 28 to determine whether the account information is valid or not more specifically includes the IP-SCP 28 processing the account-information located in the sixth message or Call-Info-From-Resource message using customer logic. The customer logic uses the actual account information stored in the IP-SCP 28, such as account codes and authorization codes, and compares the caller-entered information with the actual account-information stored in the IP-SCP 28. If the caller-entered information matches the actual account-information stored in the IP-SCP 28, the customer logic realizes a match.

At step 422, for example, if the customer logic determines that the collected account-information is valid, the method 300*b* continues to step 424, which more specifically includes processing the sixth message in the TCAP format to generate the seventh message in the TCAP format at the IP-SCP 28. The seventh message can include the account-information as well as routing and recording instructions. The routing instructions included in the sixth message may include information for enabling the MGC 24 to form a multi-media communications path between the calling or first communication device 17a and the destination or second communication device 17b. In an embodiment, the seventh message in the TCAP format is defined as an Analyze-Route message, which is also formed in the TCAP format. The seventh message or Analyze-Route message, as described above, is thereafter communicated to the MGC 24. In an embodiment, the Analyze-Route message can include at least the following information:

Package Type=Conversation with Permission to Release
        Component Type=Invoke(Last)
        Operation=AnalyzeRoute
        Parameters
            ChargeNumber
            Calling PartyID
            CalledPartyID
            Carrier
            CollectedAddressInfo
            AMAslpID
        Component Type=Invoke(last)
        Operation=Furnish_AMA The above-described terms, which are included in the exemplary Analyze Route message, are defined in Telecordia Technologies Generic Requirements GR-1129-CORE, AINGR: Service Control Point (SCP)/Adjunct Interface, Issue 7, November 2001.

The above-described step 426 of processing the seventh message or Analyze-Route record at the MGC 24 to generate the eight message in the INVITE format more specifically includes the MGC 24 generating the eighth message with the "To" header containing the destination address that the MGC 24 received in the Analyze-Route message. This eighth message further includes SDP information associated with the first message, which was previously generated by the calling or first communication device 17a.

More specifically, at step 428, the eighth message in the INVITE format is communicated to the destination or second communication device 17b. The destination or second communication device 17b responds to receipt of the eighth message by providing predetermined information to the MGC 24 to permit the MGC 24 to form a multi-media communication path between the calling or first communication device 17a and the destination or second communication device 17b, which is described below in detail. In an embodiment, the eighth message, which is communicated from the MGC 24 to the destination or second communication device 17b, can include at least the following information:

"To" field containing the IP address of the called party;
    "From" field containing the IP address of the MGC; and
    SDP of the first INVITE message mapped to the SDP of third INVITE message.

Since the MGC 24 maintains the call state or communication state formed between the calling or first communication device 17a and the destination or second communication device 17b, the MGC 24 further inserts the Record-Route header into the eighth message to ensure that all subsequent messages by either the calling or first communication device 17a and the destination or second communication device 17b are sent, via the MGC 24. In addition, the MGC 24 may set the Service Query parameter of the eighth message to "Service Processing Not Required" to avoid another IP-SCP query if the eighth message happens to flow through another MGC (not shown). Based on the billing information received from the IP-SCP 28, the MGC 24 generates a CDR record.

In response to receipt of the eighth message in the INVITE format, the destination or second communication device 17b as well as the MGC and the calling or first communication device 17a can thereafter communicate a plurality of messages in the INVITE format back and forth between each other as a part of a hand-shaking protocol. For example, the destination or second communication device 17b can send a 183-Session Progress message to the MGC 24 with SDP information related to the destination or second communication device 17b. Further, the destination or second communication device 17b can send a 200-OK message to the MGC 24.

The MGC 24 may send a Re-INVITE message to the calling or first communication device 17a containing the SDP information as received in the 200-OK message provided by the destination or second communication device 17b. In response to receipt of the Re-INVITE message provided by the MGC 24, the calling or first communication device 17a may send a 200-OK message to the MGC 24. At this point, the calling or first communication device 17a has the SDP information associated with the destination or second communication device 17b.

In response to the 200-OK message provided from the calling or first communication device 17a, the MGC 24 provides an ACK message to the calling or first communication device 17a. Upon receiving the 200-OK from the calling or first communication device 17a, the MGC 24 sends an acknowledgment by sending the 200-OK message to the destination or second communication device 17b.

It should be understood that at this instant there is a call leg formed between the calling or first communication device 17a and the MGC 24. Furthermore, there is a call leg formed between the MGC 24 and the destination or second communication device 17b. However, the media path for supporting multi-media communication is formed between the calling or first communication device 17a and the destination or second communication device 17b. Therefore, at this point, the media path between the devices 17a and 17b has been established.

In one embodiment of step 422 above, if the customer logic determines that the account-information is not valid (e.g., due to a not valid authorization code, not valid dialed number, no code entered, or number screening), then at step 430, the IP-SCP 28 processes the sixth message in the TCAP format to generate the ninth message in the TCAP format, as described above, which includes a termination message. In an embodiment, the ninth message is defined as a Termination-Send-To-Resource message, which is formed in the TCAP format and includes at least the following information:

ResourceType=FlexParameterBlock
    StrParameter Block=FlexParameterBlock
    IPResourceType=PlayAnnouncements
    PStrParameterBlock=AnnouncementDigitBlock
    Destination Address=MS IP address The above-described terms, which are included in the exemplary Termination-Send-To-Resource message, are defined in Telecordia Technologies Generic Requirements GR-1129-CORE, AINGR: Switch-Intelligent Peripheral Interface (IPI), Issue 5, November 2000.

More specifically at step 432, the ninth message or Termination-Send-To-Resource message is received and processed at the MGC 24 by mapping the contents of the ninth message in the TCAP format into the tenth message in the INVITE format, which is subsequently provided to the media server 27. At step 434, the media server 27 receives and processes the tenth message by executing the instructions received in the tenth message, such as playing the termination announcement to the calling or first communication device 17a.

In another embodiment of step 422 above, if the customer logic determines the account-information is not valid and the user of the calling or first communication device 17a is required to be re-prompted for account-information, at step 436, the IP-SCP 28 operates to re-prompt the user for another entry of account-information, at step 437. Thereafter the method 300b may be redirected back to step 414. More specifically, the IP-SCP 28 operates to re-prompt the user for another entry of account-information by sending a Call-Info-To-Resource message in the TCAP format to the MGC 24. The Call-Info-To-Resource message can include instructions to play another announcement to the calling or first communication device 17a and to collect another set of account-information. In an embodiment, the Call-Info-To-Resource message can include at least the following information:

Package Type=Conversation with Permission to Release
        Component Type Invoke(Last)
        Operation=CallInfoToResource
        Parameters
           ResourceType=FlexParameterBlock
           StrParameter Block=FlexParameterBlock
           IPResourceType=PlayAnnouncements & Collect-Digits
           IPStrParameterBlock=AnnouncementoigitBlock The above-described terms, which are included in the exemplary Call-Info-To-Resource message, are defined in Telecordia Technologies Generic Requirements GR-1129-CORE, AINGR: Switch-Intelligent Peripheral Interface (IPI), Issue 5, November 2000.

Upon receipt of the Call-Info-To-Resource message (e.g. TCAP message format) at the MGC 24, the MGC 24 maps information from the Call-Info-To-Resource message to a second INFO message in the INVITE format and sends the second INFO message to the media server 27. Upon receipt of the second INFO message, the media server 27 plays the appropriate announcements to the calling or first communication device 17a and collects the user account-information, in a similar manner as described above. Upon completion of the interaction between the calling or first communication device 17a and the media server 27, the media server 27 forwards the most recently acquired account-information in a third INFO message in the INVITE format, which is communicated to the MGC 24.

Upon receiving the third INFO message at the MGC 24, the MGC 24 maps the information from the third INFO message to a Resource-Clear message in the TCAP format, which is communicated to the IP-SCP 28 in response to the Call-Info-To-Resource message previously communicated by the IP-SCP 28. In an embodiment, the Resource-Clear message can include at least the following information:

Package Type=Conversation with Permission to Release
        Component Type=Invoke(Last)
        Operation=ResourceClear
        Parameters
          IP Return Block
          AnnouncementDigitResults
          IPCollectedDigits
          ClearCause=normal The above-described terms, which are included in the exemplary Resource-Clear message, are defined in Telecordia Technologies Generic Requirements GR-1129-CORE, AINGR: Switch-Intelligent Peripheral Interface (IPI), Issue 5, November 2000.

Upon receipt of the above-described Resource-Clear message at the IP-SCP 28, with Clear Cause=Normal, the IP-SCP 28 validates the account-information. If the account information is validated (e.g., at step 422 described above), the method 300b is directed to steps 424 through 439 to form a multi-media communication path between the calling or first communication device 17a and the destination or second communication device 17b.

On the other hand, if the account-information is again not validated, at step 422, the method 300b may be directed to steps 430 through 439 to enable the media server to play a termination message to the calling or first communication device 17a. Alternatively, if the account-information is again not validated, at step 422, the method 300b may be directed to step 436 to enable a user of the calling or first communication device 17a to re-enter account-information; thereafter, the method 300b can be redirected to step 414.

In order to disconnect communications, as described above at step 438, the media server 27 disconnects the call leg formed between the media server 27 and the MGC 24 by sending a "BYE" message to the MGC 24. After receiving the BYE message from the media server 27, the MGC 24 returns another Resource-Clear message containing a ClearCause parameter to the IP-SCP 28. In response to receipt of the Resource-Clear message, the IP-SCP 28 terminates the call by sending a Disconnect message to the MGC 24 with an Operation=Disconnect instruction. Upon receiving the Disconnect message, the MGC 24 initiates a "BYE" to the calling or first communication device 17a to disconnect the call leg formed between the MGC 24 and the calling or first communication device 17a.

In another embodiment of the present invention, the above-described step 406 of receiving and processing the second message or Info-Collected message at IP-SCP 28 can further include using the customer logic to determine whether the second message or Info-Collected message requires user interaction (e.g., whether the user of the calling or first communication device 17a is required to interact with media server, as described above). If it is determined, at step 406, that the user of the calling or first communication device 17a is not required to interact with media server 27, the IP-SCP 28 redefines the second message in the TCAP format to the sixth message in the TCAP format, which is similar to the sixth message in the TCAP format described above. Furthermore, the method 300b is accelerated to step 424 by processing the sixth message at the IP-SCP 28 to generate a seventh message or Analyze-Route message, which is also similar to that described above.

The IP-SCP 28 returns the eighth message or Analyze-Route message with the routing and recording instructions to the MGC 24. After receiving the Analyze-Route message from the IP-SCP 28, and based on the address in the "Destination" field of the Analyze-Route message, the MGC 24 generates an eleventh message in the INVITE format which is similar to the eighth message in the INVITE format, as described above. The eleventh message is provided to the destination or second communication device 17b. In an embodiment, a body portion of the eleventh message in the INVITE format, which is communicated from the MGC to the second communication device 17b, can include at least the following information:

"To" field containing the IP address of the called party;
    "From" field containing the IP address of the MGC; and
    SDP of the first INVITE message mapped to the SOP of second INVITE message.

As previously described, since the MGC 24 maintains the call state information between the calling or first communication device 17a and the destination or second communication device 17b, the MGC 24 inserts the Record-Route header into the eleventh message to ensure that all subsequent messages from either of the devices 17a or 17b are sent via the MGC 24. Further, the MGC 24 creates a Call Detail Record for this call.

The destination or second communication device 17b receives the eleventh message from the MGC 24. In response to the eleventh message, the destination or second communication device 17b as well as the MGC 24 and calling or first communication device 17a can send a plurality of messages in the INVITE format between each other as part of a handshaking protocol, similar to that described above. For example, the destination or second communication device 17b returns a 183-Session Progress message to the MGC 24, which includes SOP information associated with the destination or second communication device 17b. After receiving the 183-Session Progress, the MGC 24 sends a 183-Session Progress message to the calling or first communication device 17a with the SOP information, which was previously received from the destination or second communication device 17b.

The calling or first communication device 17a acknowledges the 183-Session Progress message received from the MGC 24 with a PRACK message, which is provided from the calling or first communication device 17a to the MGC 24. After receiving the PRACK message from the calling or first communication device 17a, the MGC 24 sends the PRACK message to the destination or second communication device 17b. In response, the destination or second communication device returns a 200-OK message, via the MGC 24, to the calling or first communication device 17a.

At this instant, the calling or first communication device 17a communicates with the destination or second communication device 17b for establishing resource reservation using RSVP-TE. After resource reservation, the calling or first communication device 17a sends a COMET message to the destination or second communication device 17b confirming successful resource reservation. In response to the COMET message, the destination or second communication device 17b sends a 200-OK message to the calling or first communication device 17a, via the MGC 24.

Thereafter, the destination or second communication device 17b sends a 180-Ringing message to the calling or first communication device 17a, via the MGC 24. The calling or first communication device 17a sends a PRACK message to the destination or second communication device 17b, via the MGC 24, in response to the 180-Ringing message. The destination or second communication device 17b sends a 200-OK message to the calling or first communication device 17a, via the MGC 24, in response to the PRACK message. The destination or second communication device 17b thereafter sends a 200-OK message to the MGC 24 in response to receipt of the second INVITE message, as described above.

After receipt of the 200-OK message, the MGC 24 sends a 200-OK message to the calling or first communication device 17a in response to receipt of the first message in the INVITE format provided from the calling or first communication device 17a. Thereafter, the calling or first communication device 17a sends an ACK message directly to the destination or second communication device 17b. It should be understood that at this instant, a call leg is formed between the calling or first communication device and the MGC 24. Further, there is a call leg formed between the MGC 24 and the destination or second communication device 17b. However, a multi-media path for supporting a multi-media session is formed directly between the calling or first communication device 17a and the destination or second communication device 17b (i.e., not through the MGC 24).

It should be understood that a first plurality of messages can be communicated between the calling or first communication device 17a, destination or second communication device 17b and/or the MCG 24 using an INVITE format. Further, it should be understood that a second plurality of messages can be communicated between the MCG 24 and the IP-SCP 28 using a TCAP format. Moreover, it should be understood that the first plurality of messages may each include attributes from the second plurality of messages, and visa-versa, without departing from the spirit and scope of the present invention.

Figure 12:
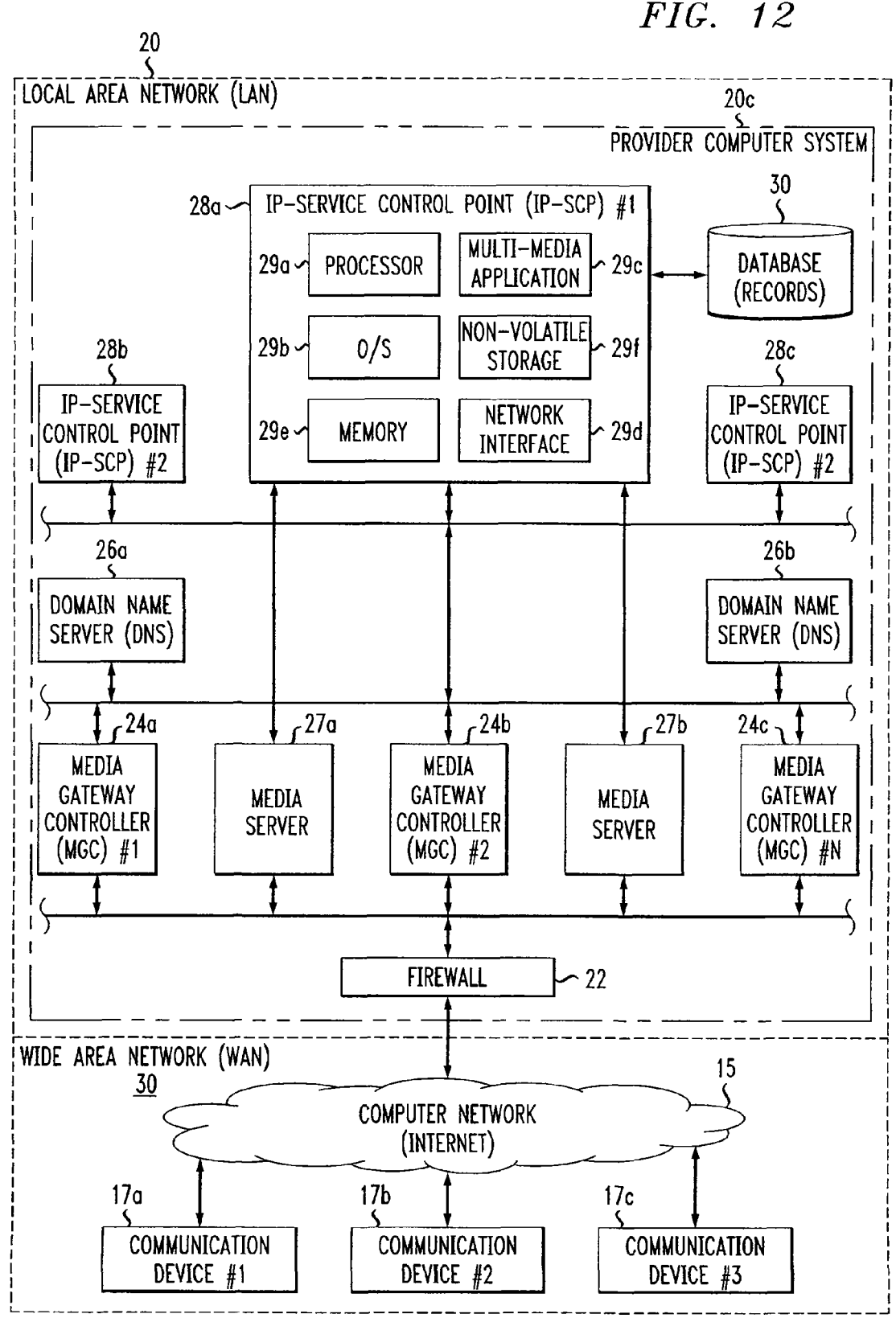
FIG. 12 is another embodiment of an expanded schematic block diagram of the system of FIG. 1.

FIG. 12 shows another embodiment of an expanded schematic block diagram of the Multi-Media Services Provider Computer System 20c, which is similar to the Multi-Media Services Provider Computer System 20b located on the LAN 20 of FIG. 9. In this aspect of the present invention, the Multi-Media Services Provider Computer System 20c further includes a direct communication coupling formed between one or more of the media servers 27 and one or more of the IP-SCPs 28. The direct communication coupling formed between the one or more media servers 27 and the one or more IP-SCPs 28 permits the one or more media servers 27 to directly communicate with the one or more IP-SCPs 28, which increases system efficiency by increasing the rate at which user requests for multi-media features can be processed. The remaining components in this embodiment are similar to the components shown in FIG. 9 and have similar reference designations.

Figure 13:
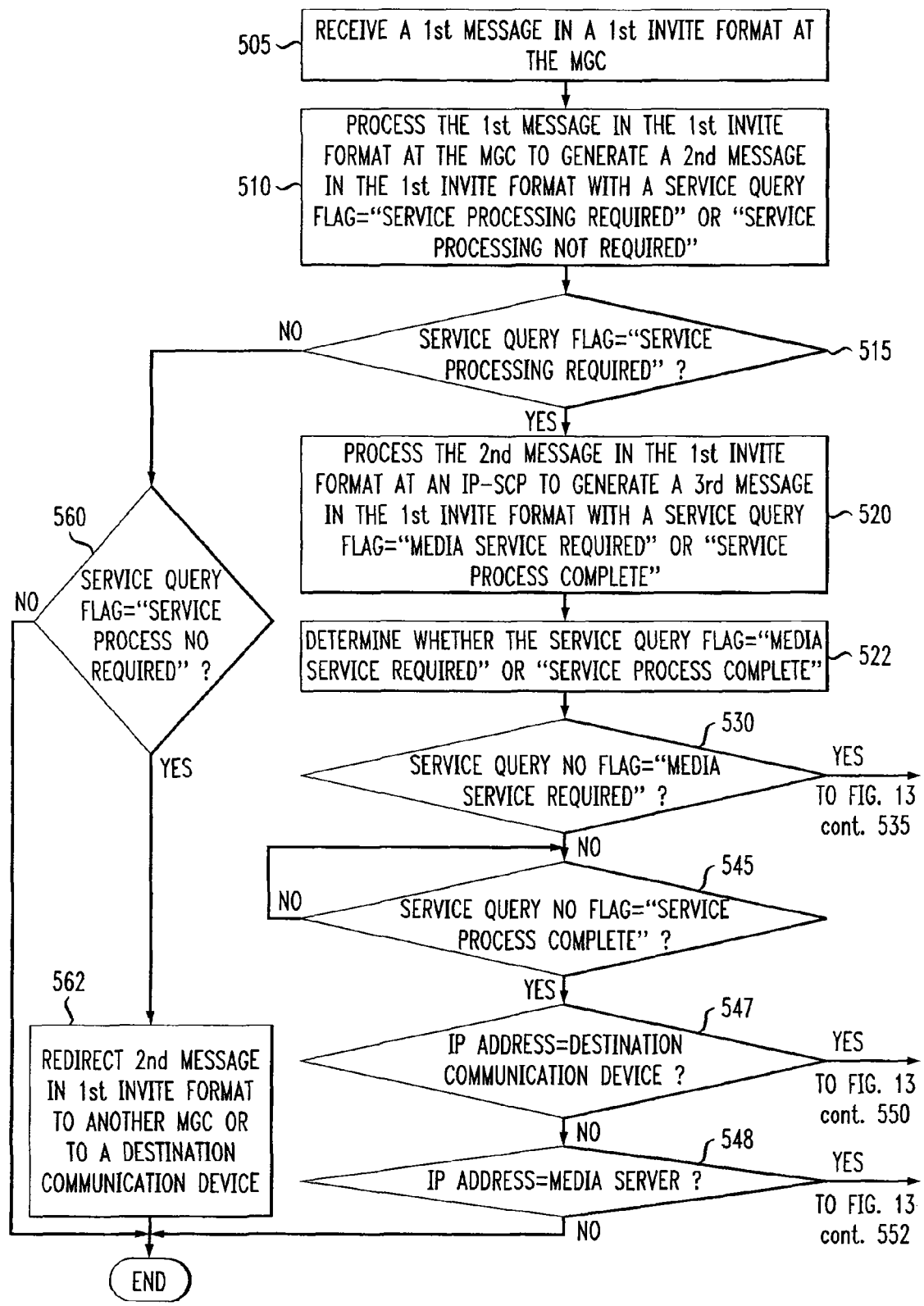
FIG. 13 is a flow chart illustrating process steps executable on the system of FIG. 12.
Figure 13:
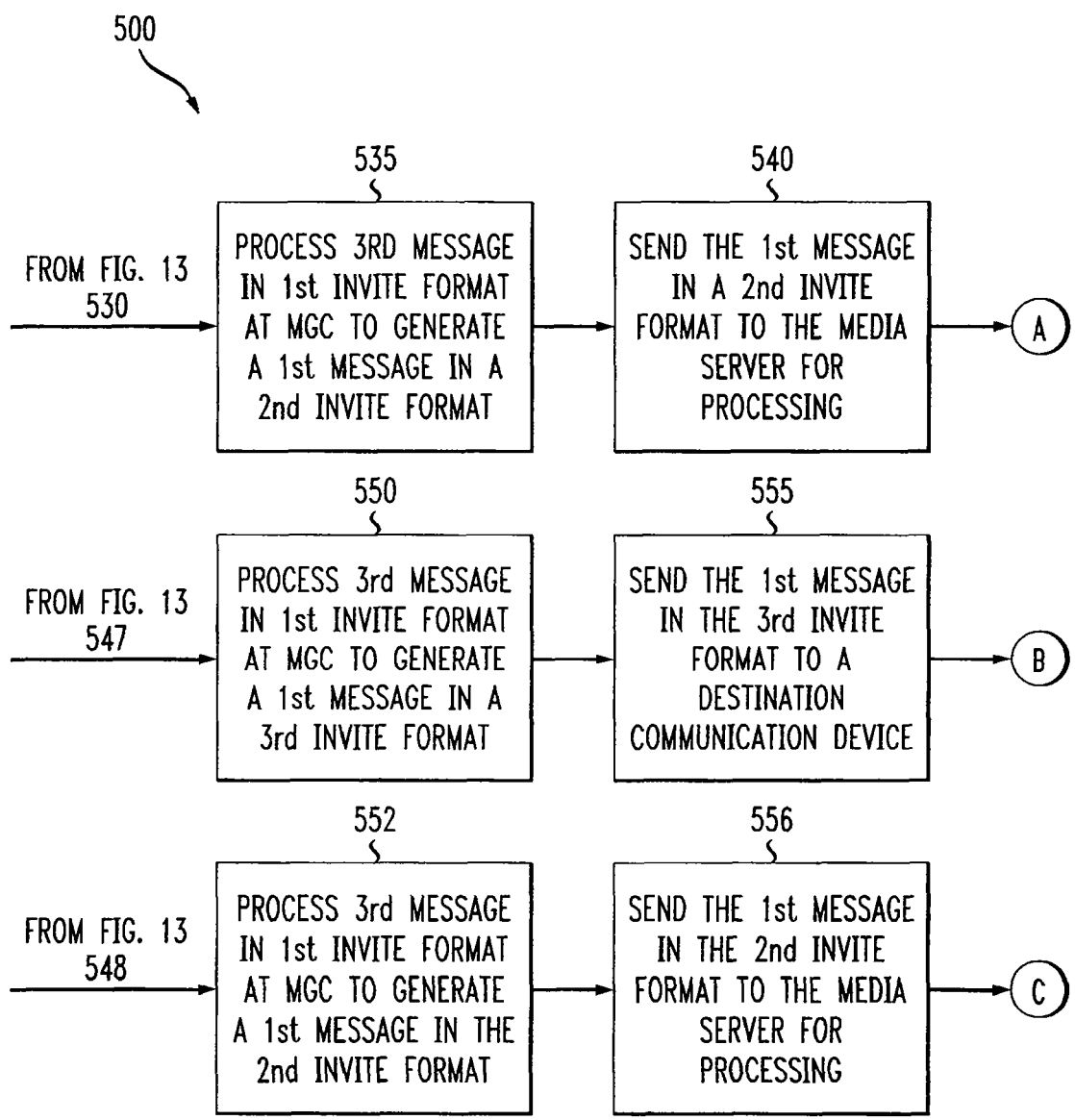

Referring to FIG. 13 in conjunction with FIG. 12, an embodiment of a method 500 for forming direct multi-media communications between the Multi-Media Services Provider Computer System 20c and one of or more of the plurality of communications devices 17a, 17b, 17c or between two or more of the plurality of communication devices 17a, 17b, 17c includes a user at the calling or first communication device 17a generating an initial or first message in a first SIP INVITE format (hereinafter referred to as "first INVITE format"). The user of the calling or first communication device 17a may generate the first message in the first INVITE format by dialing a number associated with a destination or second communication device (e.g., Called Party Number), such as the Called Party Number associated with the destination or second communication device 17b. The first message in the first INVITE format arrives at the MGC 24 with the Called Party Number and other information. The first message in the first INVITE format may contain a user-agent parameter such as "user=phone," where the phone number is an E.164 type phone number. For example, the first message in the first INVITE format may contain sip:+732.949.7821@att.com; user=phone SIP/2.0. The user-agent parameter set to "user=phone," as described above, distinguishes the Request-URI address as a telephone number, rather than a user name.

At steps 505 and 510, the first message in the first INVITE format is received and processed at the MGC 24 to generate a second message in the first INVITE format. The second message can include a service query flag having a value set to "Service Processing Required," which may be inserted into the second message by the MGC 24.

More specifically at step 510, processing the first message in the first INVITE format at the MGC 24 includes the MGC 24 sending a 100-Trying message to the calling or first communication device 17a. Thereafter, the MGC 24 performs pre-query screening on the information contained in the "To" header of the first message in the first INVITE format. Screening may be provisioned in the MGC 24 that will permit the MGC 24 to block calls such as 0+, 0−, or NI, rather than query the IP-SCP 28 for such calls. If the first message in the first INVITE format does not contain a destination IP address, the MGC 24 sends a DNS query with the appropriate parameters to the DNS 26 to obtain the IP address that corresponds to the destination in the "To" header. After receiving the DNS query response, the MGC 24 populates the IP address into the "To" header of the first message in the first INVITE format. The MGC 24 further inserts the service query flag into the first message, which has a value of "Service Processing Required." Insertion of the service query flag with the value of "Service Processing Required" defines an embodiment of the second message in the first INVITE format. Thereafter, the second message in the first INVITE format may be communicated from the MGC 24 to the IP-SCP 28 without modifying any other information.

Furthermore with respect to step 510, if the MGC 24 determines that the first message in the first INVITE format does not require processing, the MGC 24 processes the first message in the first INVITE format by inserting a service query flag into the first message in the first INVITE format having a value of "Service Processing Not Required." Insertion of the service query flag with the value of "Service Processing Not Required" defines another embodiment of the second message in the first INVITE format. Thereafter, the second message in the first INVITE format may be communicated from the MGC 24 to either another MCG (not shown) or to one of the plurality of communication devices 17a, 17b, 17c, as described below in connection with step 562.

At step 515, a determination is made at the MGC 24 as to whether the service query flag includes the value of "Service Processing Required" (e.g. one embodiment of the second message in the first INVITE format) or "Service Processing Not Required" (e.g., another embodiment of the second message in the first INVITE format). If it is determined that the service query flag includes the value of "Service Processing Required," the method 500 continues at step 520, as described in detail below. If it is determined that the service query flag includes the value of "Service Processing Not Required," the method 500 continues at step 560, as also described in detail below.

At step 520, the IP-SCP 28 receives and processes the second message in the first INVITE format to generate a third message in the first INVITE format, which processing is described in detail below. In an embodiment, the second message in the first INVITE format can include a service query flag, which can be set to a plurality of values. For example, the service query flag may be set to "Service Processing Required," as described above, which provides a trigger to the IP-SCP 28 to process the second message in the first INVITE format. After the IP-SCP 28 completes processing of the second message to generate the third message, the IP-SCP 28 may modify the value of the service query flag included in the third message from the value of "Service Processing Required" to a value of "Media Service Required" or "Service Processing Completed," which is also described in further detail below.

More specifically at step 520, the IP-SCP 28 processes the second message in the first INVITE format to generate a third message in the first INVITE format by accessing an ANI translation table stored in the database 30 that maps an origination address of the second message in the first INVITE format to a customer account ID. Using the customer account ID from the ANI translation table, the IP-SCP 28 accesses a customer account associated with the customer account ID. The customer account includes logic and customer information, which provide appropriate screening and feature processing for the call. Depending on the logic and nature of the communication, there may be several possible scenarios.

For example, in one scenario in which no media server processing is required (i.e., the call is only routed to the destination communication device 17b), the IP-SCP 28 inserts a primary destination address in the second message in the first INVITE format, which address is associated with the destination or second communication device 17b, along with any alternate destination addresses that the MGC 24 may attempt to route in the event that the primary destination address results in a "busy" or "no answer" condition. The destination address, for example, may include an IP address, a NANP, an APN formatted number, a URL, or a combination of these addressing schemes. The IP-SCP 28 changes the URI of the second message in the first INVITE format to include the destination address of the called party. Further, the IP-SCP 28 populates the original destination address contained in the "To" header, and alternate destination addresses if provided, into a body portion of the second message in the first INVITE format.

The IP-SCP 28 may also append the appropriate billing information to the body portion of the second message in the first INVITE format. Thereafter, if no further IP-SCP 28 processing is required for the call, the IP-SCP 28 changes the value of service query parameter from "Service Processing Required" to a value of "Service Processing Completed," which defines one embodiment of the third message in the first INVITE format.

The IP-SCP 28 changes the value of service query parameter from "Service Processing Required" to a value of "Service Processing Completed," as described above, when the call (e.g., second message in the first INVITE format) only requires a number translation feature, when the call requires a screening feature that does not require user interaction, when the call requires a billing feature, or when the call requires a terminating announcement due to an invalid customer account. In the case where the IP-SCP 28 determines that the call needs to be terminated with an announcement, the IP-SCP 28 populates the terminating announcement ID in the message body and the IP Address of the media server 27 in the URI of the header of the second message in the first INVITE format, which is now redefined as the third message in the first INVITE format, as described above.

Also for the scenario described above, when the call (e.g., second message in the first INVITE format) only requires a number translation feature, a screening feature that does not require user interaction, a billing feature, or a terminating announcement due to an invalid customer account, the IP-SCP 28 should not insert its own address in the "Via" header of the third message in the first INVITE format. As a result, any future generated responses and/or signaling messages from the destination or second communication device 17b will avoid traversing back and forth between the calling or first communication device and destination or second communication device 17b via the IP-SCP 28. Rather, the responses from the destination or second communication device 17b should go directly to the MGC 24, without going through the IP-SCP 28. The IP-SCP 28 may thereafter communicate the third message in the first INVITE format back to the MGC 24.

However, if the IP-SCP 28 determines that the second message in the first INVITE format requires user-interaction to complete processing for the call, instead of changing the value of service query parameter from "Service Processing Required" to a value of "Service Processing Completed," as indicated above, the IP-SCP 28 changes the value of service query parameter from "Service Processing Required" to a value of "Media Server Required." For example, the second message in the first INVITE format may require user-interaction to complete processing for the call when an authorization code or an account code is required from the user of the calling or first communication device 17a in order to process the call. In this instance, the IP-SCP 28 may modify the value of service query flag from "Service Processing Required" to a value of "Media Server Required," which defines another embodiment of the third message in the first INVITE format.

At step 522, the MGC 24 can process the third message in the first INVITE format, which was received from the IP-SCP 28, to determine if the service query field includes a value of "Media Server Required," or "Service Processing Completed." Depending on the value of the service query flag, as described above, the MGC 24 may process the third message in the first INVITE format to generate a predetermined message in a predetermined format, which can be communicated to either the media server 27 or to the second or destination communication device 17b, as described below.

For example, at step 530, the MGC 24 can determine if the third message in the first INVITE format includes the service query flag having a value of "Media Server Required." If the MGC 24 determines that the third message in the first INVITE format includes the service query flag having a value of "Media Server Required," at step 530, the MGC 24 processes the third message in the first INVITE, at step 535, to generate a first message in a second INVITE format. Furthermore, at step 540, the MGC 24 sends the first message in a second INVITE format to the media server 27 to establish a second INVITE-session between the MGC 24 and the media server 27, which is described in detail below.

At step 545, the MGC 24 can determine if the third message in the first INVITE format includes the service query flag having a value of "Service Processing Completed." If the MGC 24 determines that the third message in the first INVITE format includes the service query flag having a value of "Service Processing Completed," at step 545, the MGC 24 further determines if the IP address included in the URI of the third message in the first INVITE format is associated with a destination or second communication device 17b, at step 547. If at step 547 it is determined that the URI of the third message in the first INVITE format is associated with a destination or second communication device 17b, the MGC 24 processes the third message in the first INVITE format, at step 550, to generate a first message in a third INVITE format. At step 555, the first message in the third INVITE format may be sent to the destination or second communication device 17b. Sending the first message in the third INVITE format to the destination or second communication device 17b may form a multi-media communication session between the calling or first communication device 17a and the destination or second communication device 17b, which is described in detail below with reference to FIGS. 13 and 15.

If at step 547, it is determined by the MGC 24 that the URI of the third message in the first INVITE format is not associated with the destination or second communication device 17b, the method 500 further includes determining if the URI of the third message in the first INVITE format is associated with a media server 27, at step 548. If it is determined by the MGC 24, at step 548, that the URI of the third message in the first INVITE format is associated with a media server 27, the MGC 24 processes the third message in the first INVITE format, at step 552, to generate a first message in the second INVITE format. At step 556, the first message in the second INVITE format may be sent from the MGC to the media server 27, which is described in detail below with reference to FIGS. 13 and 16. Sending the first message in the second INVITE format to the media server 27 may form a multi-media communication session between the media server 27 and the calling or first communication device 17a. In an embodiment, the media server 27 may elect to play announcements to the calling or first communication device 17a. In one embodiment, an announcement played by the media server 27 may include "Sorry you entered the wrong authorization code." In another embodiment, an announcement played by the media server 27 may include "Sorry your call can not be completed at this time because the office is closed."

At step 560, the MGC 24 can determine if the second message in the first INVITE format includes the service query flag having a value of "Service Processing Not Required." If the MGC 24 determines that the second message in the first INVITE format includes the service query flag having a value of "Service Processing Not Required," the MGC 24 can redirect the second message in the first INVITE format to either another MGC (not shown) or to the destination or second communication device 17b, at step 562, and the method 500 ends at step 563.

More specifically step 535, which includes processing the third message in the first INVITE format at the MGC 24, which includes the service query flag having a value of "Media Server Required," to generate the first message in the second INVITE format, further includes determining if the third message in the first INVITE format includes a Transaction ID equivalent to the currently open (e.g., not timed-out) transaction formed between the IP-SCP 28 and the MGC 24, a request to play announcements and an announcement ID. If the MGC 24 determines that the third message in the first INVITE format includes a Transaction ID equivalent to the currently open (e.g., not timed-out) transaction formed between the IP-SCP 28 and the MGC 24, a request to play announcements and an announcement ID, the MGC 24 "parks" or saves the third message in the first INVITE format at the MGC 24. Thereafter, the MGC 24 generates the first message in the second INVITE format, which includes attributes of the third message in the first INVITE format, which was received from the IP-SCP 28. Thereafter, the MGC 24 sends the first message in the second INVITE format to the media server 27 to form the second INVITE-session between the MGC 24 and the media server 27, as described above with respect to step 540.

In an embodiment, the first message in the second INVITE format, which is sent from the MGC 24 to the media server 27, can include a "To" field containing the IP address of the media server 27, a "From" field containing the IP address of the MGC, an SDP of the first message in the third INVITE format mapped to the SDP of the first message in the second INVITE format, an instruction to play an announcement ID in the body portion of the first message in the second INVITE format, an IP address of the IP-SCP 28 in the body portion of the first message in the second INVITE format, and a Transaction ID of the IP-SCP 28 to MGC 24 transaction in the body portion of the first message in the second INVITE format.

Figure 14:
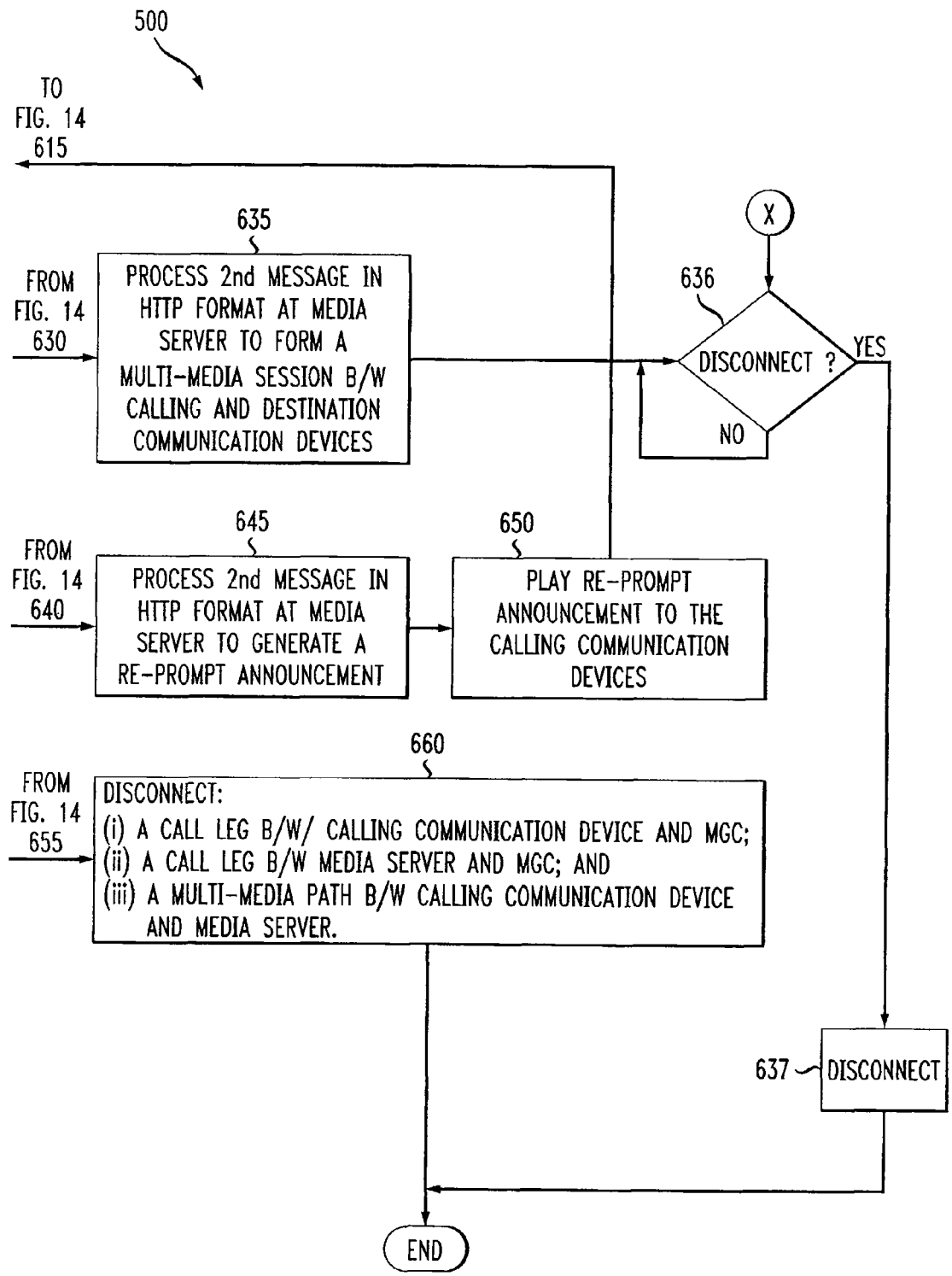
FIG. 14 is a flow chart illustrating further details of the flow chart of FIG. 13.

Referring further to FIG. 14, after forming the second INVITE-session between the MGC 24 and the media server 27, as described above at step 540, the method 500 further includes processing the first message in the second INVITE format at the media server 27, at step 605, to form a call leg between the first or calling communication device 17a and the MGC 24, to form a call leg between the MGC 24 and the media server 27, and to form a multi-media session between the media server 27 and the first or calling communication device 17a.

More specifically at step 605, the media server 27 processes the first message in the second INVITE format by sending a 183-Session Progress message to the MGC 24, which includes SDP information associated with the media server 27.

It should be understood that at this point the media server 27 has the SDP information of the calling or first communication device 17*a* because the SDP information associated with the calling or first communication device 17*a* was included in the first message in the second INVITE format, as sent to the media server 27 by the MGC 24. Furthermore, in order to simplify the description herein, the intermediate progress messages that are included in the SIP protocol, such as the PRACK message and the COMET message, as described in the hand-shaking protocol below, are not included in the exemplary embodiment herein. Even though the intermediate progress steps are not described in the exemplary embodiment herein, it should be understood that the intermediate progress steps are nevertheless included, as would be apparent to one of ordinary skill in the art.

In response to receipt of the 183-Session Progress message at the MGC 24, the MGC 24 forwards the 183-Session Progress message, including the media server 27's SDP information, to the calling or first communication device 17*a*. At this instant, the calling or first communication device 17*a* has possession of the SDP information associated with the media server 27.

Thereafter, the media server 27 sends a 200-OK message to the MGC 24 in response to receipt of the first message in the second INVITE format. Upon receipt of the 200-OK message from the media server 27, the MGC 24 sends a 200-OK message to the calling or first communication device 17*a*, which operates as a response to the first message in the first INVITE format initially communicated from the calling or first communication device 17*a* to the MGC 24. The calling or first communication device 17*a* sends an ACK message to the MGC 24 to acknowledge the 200-OK message and, similarly, the MGC 24 sends an ACK message to the media server 27 to acknowledge the 200-OK message. At this instant, as described above with respect to step 605, a call leg is formed between the calling or first communication device 17*a* and the MGC 24, and a call leg is formed between the MGC 24 and the media server 27. Furthermore, a multi-media session is formed directly between the calling or first communication device 17*a* and the media server 27 (e.g., not via the MGC 24).

At step 610, the media server 27 can now play a plurality of predetermined announcements to the calling or first communication device 17*a*. The plurality of predetermined announcements played to the first communication device 17*a* can be based on the announcement ID, which is collected from the calling or first communication device 17*a* as user-entered information (e.g., an authorization code). At step 615, the media server 27 receives the user-entered information or authorization code and formats the authorization code for subsequent communication to the IP-SCP 28.

At step 620, in order to form a multi-media path directly between the media server 27 and the IP-SCP 28, the media server 27 initiates an HTTP session with the IP-SCP 28 by generating a first message in an HTTP format, which is sent to the IP-SCP 28. In an embodiment, the first message in the HTTP format can be defined as an HTTP form POST message. A body portion of the first message in the HTTP format can include a "Caller-Entered Data" parameter and Transaction ID of the IP-SCP 28 call processing logic associated with this call, which was initiated by receipt of the first message in the second INVITE format. The "Caller-Entered Data" parameter is employed by both the media server 27 and the IP-SCP 28 to communicate information related to the caller-data, which is entered by a user/caller at the calling or first communication device 17*a*. Upon collecting the input from the caller-data from a user of the first communication device 17*a*, the media server 27 creates the Caller-Entered Data parameter, as described above. The IP-SCP 28 changes the value of the Caller-Entered Data parameter to indicate to the media server 27 whether or not the caller-entered data is valid and what action to take, which is described in detail below.

In an embodiment, the Caller-Entered Data parameter of the first message in the HTTP format may include the following fields: Parameter Name—Caller-Entered Data; Parameter Length; Action field; and Caller-Entered Data field. In an embodiment, the Action field, which is defined in the Caller-Entered Data parameter, may include at least one of the following values: "Validate Caller-Entered Data," "Valid and Connect," "Invalid and Re-prompt;" and "Invalid and Disconnect."

The value of "Validate Caller-Entered Data," which is included in the Action field of the Caller-Entered Data parameter, may be initially set by the media server 27. Further, the Caller-Entered Data parameter including the Action Field set to Validate Caller-Entered Data may be sent to the IP-SCP 28 after the media server 27 collects the caller-data from the user of the calling or first communication device 17*a*, at step 615. By setting the Action field of the Caller-Entered parameter to the value of "Validate Caller-Entered Data," the media server 27 requests that the caller-data included in the first message in the HTTP format be validated by the IP-SCP 28.

At step 625, after the IP-SCP 28 has processed the caller-data in the first message in the HTTP format, the value of "Validate Caller-Entered Data" included in the first message may be modified to the value of "Valid and Connect" by the IP-SCP 28, which defines one embodiment of a second message in the HTTP format (e.g., which is provided to the media sever 27 in response to the first message in the HTTP format or first HTTP form POST message). The IP-SCP 28 further includes routing numbers in the second message in the HTTP format, which the media server 27 can process to couple the calling or first communication device 17*a* with the destination or second communication device 17*b*. The IP-SCP 28 sets the Action field to the value of "Valid and Connect" if the IP-SCP 28 determines that the caller-data is valid and that the call should be connected to the address associated with the routing numbers, as described above.

At step 630, if it is determined by the media server 27 that the second message in the HTTP format includes the Caller-Entered Data parameter having an Action field with a value of "Valid and Connect," which indicates that the caller-data is valid, the second message in the HTTP format is processed at the media server 27, at step 635, to form a multi-media session between the calling or first communication device 17*a* and the destination or second communication device 17*b*. In order to form the multi-media session between the calling or first communication device 17*a* and the destination or second communication device 17*b*, a number of handshaking messages are communicated between the Multi-Media Services Provider Computer System 20*c* and the calling or first communication device 17*a* and the destination or second communication device 17*b*.

For example, the media server 27 generates an INFO message and sends the INFO message to the MGC 24 with the routing numbers and billing information returned from the IP-SCP 28 and other appropriate information in the body of the INFO message. Upon receiving the INFO message, the MGC 24 generates a first message in the third INVITE format (e.g., as described above in step 550) with the "To" header containing the destination address the MGC 24 received in the INFO message. The MGC 24 sends the first message in the third INVITE format to the destination or second communication device 17b (e.g., as described above in step 555) with the SDP information associated with the calling or first communication device 17a.

The destination or second communication device 17b sends a 183-Session Progress message to the MGC 24 with the SDP information associated therewith, which also operates as a response to receipt of the first message in the third INVITE format. The destination or second communication device 17b sends a 200-OK message to the MGC 24. In response, the MGC 24 sends a fourth message in the first INVITE format (e.g., Re-INVITE message) to the calling or first communication device 17a, which contains the SDP information as received in the 200-OK message received from the destination or second communication device 17b. The calling or first communication device 17a sends a 200-OK message to the MGC 24 in response to receipt of the Re-INVITE message. At this instant, the calling or first communication device 17a has the SDP information associated with the destination or second communication device 17b. The MGC 24 sends an ACK message to the calling or first communication device 17a to acknowledge receipt of the 200-OK message.

At this instant, a call leg is formed between the calling or first communication device 17b and the MGC 24, and a call leg is formed between the MGC 24 and the destination or second communication device 17b. Further, a direct multi-media path is formed between the calling or first communication device 17a and the destination or second communication device 17b.

At step 636, if a user of either the calling or first communication device 17a or the destination or second communication device 17b decides to end the conversation or disconnect, the call-ending device 17a or 17b sends a BYE message to the other device 17a or 17b, via the MGC 24. Upon receiving the BYE message at the MGC 24, the MGC 24 creates a stop CDR. The device (e.g. either calling 17a or destination 17b), which receives the BYE message responds by sending an OK message, via the MGC 24, to the opposing device (e.g., either calling 17a or destination 17b) and the communication previously formed between the calling or first communication device 17a and the destination or second communication device 17b is disconnected at step 637 and the method 500 ends at step 670.

Alternatively at step 625, after the IP-SCP 28 has processed the caller-data in the first message in the HTTP format, the value of "Validate Caller-Entered Data" included in the first message may be modified to the value of "Invalid and Re-prompt" by the IP-SCP 28, which defines another embodiment of the second message in the HTTP format (e.g. which is provided to the media sever 27 in response to the first message in the HTTP format or first HTTP form POST message). The IP-SCP 28 sets the Action field of the Caller-Entered Data parameter of the second message in the HTTP format to the value of "Invalid and Re-prompt" if the IP-SCP 28 determines that the caller-data is invalid or incorrect and the media server 27 should re-prompt the caller/user of the calling or first communication device 17a for new or additional caller-data. Further, the IP-SCP 28 also sends the appropriate announcement ID to the media server 27.

At step 640, if it is determined by the media server 27 that the second message in the HTTP format includes the Caller-Entered Data parameter with an Action field having a value of "Invalid and Re-prompt," which indicates that the caller-data is not valid, the second message in the HTTP format is processed at the media server 27, at step 645, to generate a re-prompt announcement to the calling or first communication device 17a. Further at step 650, the re-prompt announcement is played to the calling or first communication device 17a and the method 500 is thereafter redirected back to step 615 and the above-described method 500 is repeated.

In a further alternative at step 625, after the IP-SCP 28 has processed the caller-data in the first message in the HTTP format, the value of "Validate Caller-Entered Data" included in the first message may be modified to the value of "Invalid and Disconnect" by the IP-SCP 28, which defines yet another embodiment of the second message in the HTTP format (e.g. which is provided to the media sever 27 in response to the first message in the HTTP format or first HTTP form POST message). The IP-SCP 28 sets the Action field of the Caller-Entered Data parameter to the value of "Invalid and Disconnect" if the IP-SCP 28 determines that the caller-data is invalid and that the media server 27 should disconnect the call.

At step 655, if it is determined by the media server 27 that the second message in the HTTP format includes a Caller-Entered data processor with an Action field having a value of "Invalid and Disconnect," which indicates that the caller-data is again not valid, the second message in the HTTP format is processed at the media server 27, at step 660, to disconnect the call leg formed between the calling or first communication device 17a and the MGC 24, and between the MGC 24 and the media server 27. Furthermore at step 660, the second message in the HTTP format is further processed at the media server 27 to disconnect the multi-media session formed between the media server 27 and the calling or first communication device 17a and the method 500 ends at step 670.

In one specific example, the first message in the HTTP format (e.g., first HTTP POST message), which is initiated by the media server 27 and sent to the IP-SCP 28, can include a Caller-Entered Data parameter with an Action Field equal to "Validate Caller-Entered Data," Caller-Entered data and a Transaction ID of the IP-SCP 28 with corresponding processing logic for this session or call. The IP-SCP 28 receives the first message in the HTTP message format from the media server 27 and, based on the Caller-Entered Data parameter containing the Action Field set to "Validate Caller-Entered Data," the IP-SCP 28 uses the Transaction ID to bypass the initial processing of the Customer Account Logic and executes the appropriate data validation logic. After executing the data validating logic, the IP-SCP 28 sends a response, such as a second message in the HTTP format (e.g., 200-OK message) to the media server 27, which serves as a response to the first message in the HTTP format. This response contains the Caller-Entered Data Parameter with an Action Field set appropriately based on the validity of the caller-data, as described above. The second message in the HTTP format can further include billing information and one or more destination addresses to route the call (e.g., depending on whether or not the call is to be routed). It is noted that the media server 27 saves the transaction ID, so that the IP-SCP 28 does not need to send it back to the media server 27.

Similar to that described above, based on the value of the "Caller-Entered Data Parameter," which is returned from the IP-SCP 28 to the media server 27 in the second message in the HTTP format, the media server 27 can perform one more operation: if the Caller-Entered Data Parameter contains an Action field equal to "Valid and Connect," the media server 27 generates an INFO message and sends the INFO message to the MGC 24 with the routing numbers and billing information returned from the IP-SCP 28 and other appropriate information in the body of the INFO message.

Upon receiving the INFO message, the MGC 24 generates a first message in the third INVITE format (e.g., as described above in step 550) with the "To" header containing the destination address the MGC 24 received in the INFO message. The MGC 24 sends the first message in the third INVITE format to the destination or second communication device 17b (e.g., as described above in step 555) with the SDP information associated with the calling or first communication device 17a. The destination or second communication device 17b sends a 183-Session Progress message to the MGC 24 with the SDP information associated therewith, which also operates as a response to receipt of the first message in the third INVITE format. The destination or second communication device 17b sends a 200-OK message to the MGC 24. In response, the MGC 24 sends a fourth message in the first INVITE format (e.g., Re-INVITE message) to the calling or first communication device 17a, which contains the SDP information as received in the 200-OK message received from the destination or second communication device 17b. The calling or first communication device 17a sends a 200-OK message to the MGC 24 in response to receipt of the Re-INVITE message. At this instant, the calling or first communication device 17a has the SDP information associated with the destination or second communication device 17b. The MGC 24 sends an ACK message to the calling or first communication device 17a to acknowledge receipt of the 200-OK message.

At this instant, a call leg is formed between the calling or first communication device 17a and the MGC 24, and a call leg is formed between the MGC 24 and the destination or second communication device 17b. Further, a direct multi-media path is formed between the calling or first communication device 17a and the destination or second communication device 17b.

If the Caller-Entered Data parameter contains an Action field having a value of "Invalid and Re-prompt," the media server 27 plays one or more announcements to the calling or first communication device 17a and recollects the user-entered data (i.e., caller-data). Similar to that described above, the media server 27 initiates an HTTP session with the IP-SCP 28 by generating an HTTP form POST message followed by a number of hand-shaking related protocols communicated between the various components of the Multi-Media Services Provider Computer System 20c and first 17a and/or second 17b communication devices, as also similarly described above.

If the Caller-Entered Data parameter contains an Action field having a value of "Invalid and Disconnect," the media server 27 plays a final handling announcement to the calling or first communication device 17a. Furthermore, the media server 27 generates an INFO message, which is sent to the MGC 24 and includes billing information and instructions to disconnect the call. Upon receiving the INFO message at the MGC 24, the MGC 24 sends a BYE message to the media server 27 and disconnects the call leg formed between the MGC 24 and the media server 27. Based on the billing information received in the INFO message, the MGC 24 creates a stop CDR. The MGC 24 sends a BYE message to the calling or first communication device 17a and disconnects the call leg formed between the MGC 24 and the calling or first communication device 17a.

Step 555, which as described above includes sending the first message in the third INVITE format to the destination or second communication device 17b, further includes the MGC 24 creating a Call Detail Record (CDR) for this call by using the billing information returned from the IP-SCP 28 in the third message in the first INVITE format. Since the MGC 24 maintains the call state, the MGC 24 inserts a Record-Route header into the first message in the third INVITE format to ensure that all subsequent messages by either party (e.g., the calling 17a or destination 17b communication devices) are sent via the MGC 24. In certain instances, the MGC 24 may perform digit manipulation (delete and prefix) on the destination address in the "To" header of the first message in the third INVITE format.

Referring further to FIG. 15, at step 555a, the destination or second communication device 17b receives and responds to receipt of the first message in the third INVITE format by communicating a plurality of messages back and forth between itself and the MGC 24 (e.g., hand-shaking protocol) for enabling the MGC 24 to form a multi-media session between the calling or first communication device 17a and the destination or second communication device 17b.

For example, the hand-shaking protocol may include the destination or second communication device 17b returning a 183-Session Progress message to the MGC 24, which includes SDP information associated with the destination or second communication device 17b. The MGC 24 responds to receipt of the 183-Session Progress message by forwarding the 183-Session Progress message to the calling or first communication device 17a. The calling or first communication device 17a acknowledges receipt of the 183-Session Progress message with a PRACK message, which is returned back to the destination or second communication device 17b via the MGC 24. In response to receipt of the PRACK message, the destination or second communication device 17b provides a 200-OK message to the calling or first communication device 17a via the MGC 24.

At this instant, the calling or first communication device 17a and the destination or second communication device 17b communicate with each other for resource reservation using Resource Reservation Protocol-Traffic Engineering (RSVP-TE). After resource reservation is complete, the calling or first communication device 17a sends a COMET message to the destination or second communication device 17b confirming success. In response to receipt of the COMET message, the destination or second communication device 17b sends a 200-OK message to the calling or first communication device 17a via the MGC 24. Further, the destination or second communication device 17b sends a 180-Ringing message to the calling or first communication device 17a via the MGC 24. The calling or first communication device 17a responds to receipt of the 180-Ringing message by sending a PRACK message to the destination or second communication device 17b via the MGC 24. The destination or second communication device 17b sends a 200-OK message to the calling or first communication device 17a via the MGC 24 in response to receipt of the PRACK message.

Furthermore, in response to receipt of the first message in the third processed INVITE message at the destination or second communication device 17b (e.g., at step 555a), the destination or second communication device 17b sends another 200-OK message, via the MGC 24, to the calling or first communication device 17a. Upon receipt of the 200-OK message at the calling or first communication device 17a, the calling or first communication device 17a sends an ACK message to the destination or second communication device 17b via the MGC 24. At this instant, a media path is formed between the calling or first communication device 17a and the destination or second communication device 17b.

Step 556, as described above, which includes sending the first message in the second INVITE format to the media server 27, more specifically includes the MGC 24 creating a CDR for the communication session or multi-media session formed between the media server 27 and the calling or first communication device 17a. In an embodiment, the first message in the second format, which includes the service query parameter having a value of "Service Processing Completed" and the "To" header having at least one address associated with at least one media server 27, can further include a request to play announcements along with a terminating announcement ID, billing information, and the instructions to disconnect the call. This embodiment may be sent to the media server 27, as described above, with instructions to play the terminating announcement to the calling or first communication device 17a and to disconnect the call by directing the method 500 to steps 636 through 637, as described above with respect to FIG. 14.

Referring further to FIG. 16, at step 556a, the media server 27 receives and responds to receipt of the first message in the second INVITE format by communicating a plurality of messages back and forth between itself and the MGC 24 (e.g., hand-shaking protocol) for enabling the MGC 24 to form a multi-media session between the calling or first communication device 17a and the media server 27.

For example, the hand-shaking protocol may include the media server 27 returning a 183-Session Progress message to the calling or first communication device 17a via the MGC 24, which 183-Session Progress message includes SDP information associated with the media server 27. The calling or first communication device 17a acknowledges receipt of the 183 Session Progress message with a PRACK message, which is communicated back to the media server 27 via the MGC 24. The media server 27 responds to receipt of the PRACK message by returning a 200-OK message back to the calling or first communication device 17a via the MGC 24. Upon receiving the PRACK message, the media server 27 returns a 200-OK message back to the calling or first communication device 17a via the MGC 24. At this instant, the calling or first communication device 17a and the media server 27 communicate with each other for resource reservation using RSVP-TE.

After resource reservation, the calling or first communication device 17a sends a COMET message to the media server 27 confirming success. Upon receipt of the COMET message at the media server 27, the media server 27 sends a 200-OK message to the calling or first communication device 17a via the MGC 24. Upon receipt of the 200-OK message, the calling or first communication device 17a sends an ACK message to the media server 27. At this instant, a media path is formed between the calling or first communication device 17a and the media server 27. Thereafter, the media server 27 may play an announcement to the calling or first communication device 17a, such as a termination announcement based on the announcement ID. Further, the media server 27 may also send a BYE message to the calling or first communication device 17a via the MGC 24, which disconnects the communication path formed between the media server 27 and the calling or first communication device 17a, as similarly described in steps 636 through 637 of FIG. 14.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of processing multi-media service requests received at a multi-media services provider computer system including a media gateway controller having a processor and to a media server, the method comprising:

receiving a first message in a first format at the media gateway controller from a first one of a plurality of communication devices;

processing the first message at the processor of the media gateway controller for generating an instruction message that is communicated to the media server;

responding to the instruction message at the media server by communicating a predetermined announcement to the first communication device;

receiving predetermined account-information in the first format from the first communication device at the media server in response to the predetermined announcement;

processing the predetermined account-information in the first format at the media server to generate a validation message in a second format including the predetermined account-information; and receiving the validation message in the second format including the predetermined account-information at the processor over a direct communication coupling, wherein receiving the validation message in the second format at the processor over the direct communication coupling increases a rate at which user requests is processed.

2. The method of processing multi-media service requests of claim 1, further including processing the validation message in the second format at the processor to determine if the account-information included in the validation message in the second format is valid.

3. The method of processing multi-media service requests of claim 1, wherein receiving the first message in the first format at the media gateway controller includes receiving a first message in a first session initiation protocol invite format at the media gateway controller.

4. The method of processing multi-media service requests of claim 1, wherein processing the first message at the media gateway controller includes generating a second message in a first session initiation protocol invite format having a service query flag set to a value representative of service processing required.

5. The method of processing multi-media service requests of claim 4, wherein the method further includes processing the second message in the first session initiation protocol invite format at the processor to generate a third message in the first session initiation protocol invite format and having the service query flag modified to a value representative of media server required.

6. The method of processing multi-media service requests of claim 4, wherein the method further includes processing the second message in the first session initiation protocol invite format to generate a third message in the first session initiation protocol invite format and having the service query flag modified to a value representative of service processing completed.

7. The method of processing multi-media service requests of claim 4, wherein the method further includes processing the second message in the first session initiation protocol invite format to generate a third message in the first session initiation protocol invite format and having the service query flag modified to a value representative of service processing not required.

8. The method of processing multi-media service requests of claim 5, wherein the method further includes inserting a play termination announcement instruction into the third message in the first session initiation protocol invite format at the processor.

9. The method of processing multi-media service requests of claim 5, wherein the method further includes forming a call leg to the media server by generating a first message in a second session initiation protocol invite format that defines the instruction message.

10. The method of processing multi-media service requests of claim 9, wherein the method further includes forming a connection between the first communication device and the media server to permit multi-media communications between the first communication device and the media server.

11. The method of processing multi-media service requests of claim 1, wherein generating the validation message in the second format includes generating a first message in a hypertext transfer protocol format including a caller-entered data parameter having a value set to represent validate caller-entered data.

12. The method of processing multi-media service requests of claim 11, wherein the method further includes:
 processing the first message in the hypertext transfer protocol format at the processor to formulate a second message in the hypertext transfer protocol format; and
 modifying the caller-entered data parameter to a value representative of: a valid and connect, an invalid and re-prompt or an invalid and disconnect.

13. The method of processing multi-media service requests of claim 12, wherein if the second message in the hypertext transfer protocol format is modified to include the caller-entered data parameter having the value representative of the valid and connect, the method further includes:
 processing the second message in the hypertext transfer protocol format at the media server to form a multi-media communication session between the first communication device and a second one of the plurality of communication devices.

14. The method of processing multi-media service requests of claim 13, wherein if the second message in the hypertext transfer protocol format is modified to include the caller-entered data parameter having the value representative of the invalid and re-prompt, the method further includes:
 processing the second message in the hypertext transfer protocol format at the media server to re-prompt the first communication device for other user-information.

15. The method of processing multi-media service requests of claim 12, wherein if the second message in the hypertext transfer protocol format is modified to include the caller-entered data parameter having the value representative of the invalid and disconnect, the method further includes:
 processing the second message in the hypertext transfer protocol format at the media server to disconnect communications between the media server and the first communication device.

* * * * *